(12) United States Patent
Hsu et al.

(10) Patent No.: US 8,548,782 B2
(45) Date of Patent: *Oct. 1, 2013

(54) METHOD FOR MODELING DEFORMATION IN SUBSURFACE STRATA

(75) Inventors: Sheng-Yuan Hsu, Sugar Land, TX (US);
Kevin H. Searles, Kingwood, TX (US);
Eric R. Grueschow, Houston, TX (US);
Tracy J. Moffett, Sugarland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 272 days.

This patent is subject to a terminal disclaimer.

(21) Appl. No.: 13/053,860

(22) Filed: Mar. 22, 2011

(65) Prior Publication Data

US 2011/0166843 A1     Jul. 7, 2011

Related U.S. Application Data

(63) Continuation-in-part of application No. 12/665,597, filed as application No. PCT/US2008/007238 on Jun. 10, 2008, now Pat. No. 8,423,337.

(60) Provisional application No. 60/966,031, filed on Aug. 24, 2007.

(51) Int. Cl.
*G06G 7/50* (2006.01)
*G06G 7/48* (2006.01)

(52) U.S. Cl.
USPC ....... 703/9; 703/10; 166/250.01; 166/250.03; 166/264

(58) Field of Classification Search
USPC ...................................... 703/9, 10
See application file for complete search history.

(56) References Cited

U.S. PATENT DOCUMENTS

| | | | |
|---|---|---|---|
| 3,829,685 | A | 8/1974 | McKay |
| 3,870,879 | A | 3/1975 | McKay |
| 4,797,822 | A | 1/1989 | Peters |
| 4,821,242 | A | 4/1989 | Hennington |

(Continued)

FOREIGN PATENT DOCUMENTS

| | | |
|---|---|---|
| WO | WO 2007/116008 A1 | 10/2007 |
| WO | WO 2008/131351 A1 | 10/2008 |

OTHER PUBLICATIONS

Baeten, G.J.M., et al., Directional Deconvultion in the F-X Domain, Abstract 1991:5004, Sep. 23-27, 1990, 60$^{th}$ Annual Seg. Int'l Meeting.

(Continued)

*Primary Examiner* — Omar Fernandez Rivas
*Assistant Examiner* — Angel Calle
(74) *Attorney, Agent, or Firm* — ExxonMobil Upstream Research Company—Law Department

(57) ABSTRACT

A method for modeling deformation in subsurface strata, including defining physical boundaries for a geomechanical system. The method also includes acquiring one or more mechanical properties of the subsurface strata within the physical boundaries, and acquiring one or more thermal properties of the subsurface strata within the physical boundaries. The method also includes creating a computer-implemented finite element analysis program representing the geomechanical system and defining a plurality of nodes representing points in space, with each node being populated with at least one of each of the mechanical properties and the thermal properties. The program solves for in situ stress at selected nodes within the mesh.

26 Claims, 11 Drawing Sheets

(56) References Cited

U.S. PATENT DOCUMENTS

| | | |
|---|---|---|
| 5,058,012 A | 10/1991 | Hinchman et al. |
| 5,321,612 A | 6/1994 | Stewart |
| 5,416,697 A | 5/1995 | Goodman |
| 5,619,475 A | 4/1997 | Winkler |
| 5,740,342 A | 4/1998 | Kocberber |
| 5,848,379 A | 12/1998 | Bishop |
| 5,892,732 A | 4/1999 | Gersztenkorn |
| 5,930,730 A | 7/1999 | Marfurt et al. |
| 5,986,974 A | 11/1999 | Luo et al. |
| 6,078,869 A | 6/2000 | Gunasekera |
| 6,106,561 A | 8/2000 | Farmer |
| 6,131,071 A | 10/2000 | Partyka et al. |
| 6,196,318 B1 | 3/2001 | Gong et al. |
| 6,256,603 B1 | 7/2001 | Celniker |
| 6,266,619 B1 | 7/2001 | Thomas et al. |
| 6,460,006 B1 | 10/2002 | Corcoran |
| 6,510,389 B1 | 1/2003 | Winkler et al. |
| 6,549,854 B1 | 4/2003 | Malinverno et al. |
| 6,597,995 B1 | 7/2003 | Cornu et al. |
| 6,640,190 B2 | 10/2003 | Nickel |
| 6,654,692 B1 | 11/2003 | Neff |
| 6,668,922 B2 | 12/2003 | Ziauddin et al. |
| 6,745,159 B1 | 6/2004 | Todd et al. |
| 6,751,558 B2 | 6/2004 | Huffman et al. |
| 6,754,587 B1 | 6/2004 | Trappe et al. |
| 6,766,255 B2 | 7/2004 | Stone |
| 6,785,641 B1 | 8/2004 | Huang |
| 6,804,609 B1 | 10/2004 | Brumbaugh |
| 6,810,332 B2 | 10/2004 | Harrison |
| 6,813,564 B2 | 11/2004 | Eiken et al. |
| 6,836,731 B1 | 12/2004 | Whalley et al. |
| 6,840,317 B2 | 1/2005 | Hirsch et al. |
| 6,842,700 B2 | 1/2005 | Poe |
| 6,892,812 B2 | 5/2005 | Niedermayr et al. |
| 6,901,391 B2 | 5/2005 | Storm, Jr. et al. |
| 6,941,255 B2 | 9/2005 | Kennon et al. |
| 6,947,843 B2 | 9/2005 | Fisher et al. |
| 6,978,210 B1 | 12/2005 | Suter et al. |
| 6,980,929 B2 | 12/2005 | Aronstam et al. |
| 6,980,940 B1 | 12/2005 | Gurpinar et al. |
| 6,991,032 B2 | 1/2006 | Berchenko et al. |
| 7,043,410 B2 | 5/2006 | Malthe-Sorenssen et al. |
| 7,054,752 B2 | 5/2006 | Zabalza-Mezghani et al. |
| 7,062,420 B2 | 6/2006 | Poe, Jr. |
| 7,066,019 B1 | 6/2006 | Papanastasiou |
| 7,089,166 B2 | 8/2006 | Malthe-Sorenssen et al. |
| 7,089,167 B2 | 8/2006 | Poe |
| 7,099,811 B2 | 8/2006 | Ding et al. |
| 7,113,869 B2 | 9/2006 | Xue |
| 7,177,764 B2 | 2/2007 | Stone |
| 7,181,380 B2 | 2/2007 | Dusterhoft et al. |
| 7,188,058 B2 | 3/2007 | Hardy et al. |
| 7,191,062 B2 | 3/2007 | Chi et al. |
| 7,200,539 B2 | 4/2007 | Ong et al. |
| 7,242,637 B2 | 7/2007 | Van Den Beukel et al. |
| 7,369,979 B1 | 5/2008 | Spivey |
| 7,461,691 B2 | 12/2008 | Vinegar et al. |
| 7,561,998 B2 | 7/2009 | Panga et al. |
| 7,577,061 B2 | 8/2009 | Williamson et al. |
| 7,603,261 B2 | 10/2009 | Tardy |
| 7,657,415 B2 | 2/2010 | Panga et al. |
| 7,751,979 B2 | 7/2010 | Molenaar |
| 2002/0013687 A1 | 1/2002 | Ortoleva |
| 2002/0029137 A1 | 3/2002 | Malthe-Sorenssen et al. |
| 2002/0049575 A1 | 4/2002 | Jalali et al. |
| 2002/0055868 A1 | 5/2002 | Dusevic et al. |
| 2002/0120429 A1 | 8/2002 | Ortoleva |
| 2002/0169559 A1 | 11/2002 | Onyia et al. |
| 2003/0018435 A1 | 1/2003 | Jenner et al. |
| 2004/0010373 A1 | 1/2004 | Smits et al. |
| 2004/0122640 A1 | 6/2004 | Dusterhoft |
| 2004/0199329 A1 | 10/2004 | Stone |
| 2005/0015204 A1 | 1/2005 | Xue |
| 2005/0015231 A1 | 1/2005 | Edwards et al. |
| 2005/0043890 A1 | 2/2005 | Sanstrom |
| 2005/0065730 A1 | 3/2005 | Sinha |
| 2005/0121197 A1 | 6/2005 | Lopez de Cardenas et al. |
| 2005/0125203 A1 | 6/2005 | Hartman |
| 2005/0149307 A1 | 7/2005 | Gurpinar et al. |
| 2005/0197813 A1 | 9/2005 | Grayson |
| 2005/0199391 A1 | 9/2005 | Cudmore et al. |
| 2005/0209836 A1 | 9/2005 | Klumpen et al. |
| 2005/0234690 A1 | 10/2005 | Mainguy et al. |
| 2005/0267719 A1 | 12/2005 | Foucault |
| 2005/0273302 A1 | 12/2005 | Huang et al. |
| 2005/0273304 A1 | 12/2005 | Oliver et al. |
| 2006/0015310 A1 | 1/2006 | Husen et al. |
| 2006/0047431 A1 | 3/2006 | Geiser |
| 2006/0047489 A1 | 3/2006 | Scheidt et al. |
| 2006/0085174 A1 | 4/2006 | Hemanthkumar et al. |
| 2006/0100837 A1 | 5/2006 | Symington et al. |
| 2006/0129366 A1 | 6/2006 | Shaw |
| 2006/0149518 A1 | 7/2006 | Oliver et al. |
| 2006/0153005 A1 | 7/2006 | Herwanger et al. |
| 2006/0224370 A1 | 10/2006 | Siebrits et al. |
| 2007/0083330 A1 | 4/2007 | Frenkel |
| 2007/0156377 A1 | 7/2007 | Gurpinar et al. |
| 2007/0244681 A1 | 10/2007 | Cohen et al. |
| 2007/0265782 A1 | 11/2007 | Kleinberg et al. |
| 2007/0271077 A1 | 11/2007 | Kosmala et al. |
| 2007/0294034 A1* | 12/2007 | Bratton et al. .................. 702/6 |
| 2008/0015831 A1 | 1/2008 | Tardy et al. |
| 2008/0015832 A1 | 1/2008 | Tardy |
| 2008/0033656 A1 | 2/2008 | Herwanger |
| 2008/0053213 A1 | 3/2008 | Birchwood |
| 2008/0071505 A1 | 3/2008 | Huang et al. |
| 2008/0195358 A1 | 8/2008 | El Ouair et al. |
| 2008/0319674 A1 | 12/2008 | Dai et al. |
| 2009/0055098 A1 | 2/2009 | Mese et al. |
| 2009/0116338 A1 | 5/2009 | Hoetz |
| 2009/0294122 A1 | 12/2009 | Hansen et al. |
| 2011/0166843 A1* | 7/2011 | Hsu et al. .................. 703/10 |

OTHER PUBLICATIONS

Da Silva, F.V., et al., "Casing Collapse Analysis Associated with Reservoir Compaction and Overburden Subsidence", SPE 20953, Oct. 23-24, 1990, pp. 127-133, Europec 90, The Hague, Netherlands.

Fredrich, J.T., et al., "Three-Dimensional Geomechanical Simulation of Reservoir Compaction and Implications for Well Failures in the Belridge Diatomite", SPE 36698, Oct. 6-9, 1996, pp. 195-210, 1996 SPE Annual Technical Conf. and Exh., Denver, CO.

Häusler, H., et al., "A New Exploration Approach in a Mature Basin: Integration of 3-D Seismic, Remote-Sensing, and Microtectonic Data, Southern Vienna Basin, Austria", 2002, pp. 433-451, AAPG Studies in Geology No. 48 and SEG Geophysical References Series No. 11.

Lee, T-Y., et al., "History Matching by Spline Approximation and Regularization in Single-Phase Areal Reservoirs", Sep. 1986, pp. 521-534, SPE Reservoir Engineering.

Olden, P., et al., "Modeling Combined Fluid and Stress Change Effects in the Seismic Response of a Producing Hydrocarbon Reservoir", Oct. 2001, pp. 1154-1157, The Leading Edge.

Pöppelreiter, M., et al., "Structural Control on Sweet-Spot Distribution in a Carbonate Reservoir: Concepts and 3-D Models (Cogollo Group, Lower Cretaceous, Venezuela)", Dec. 2005, pp. 1651-1676, vol. 89, No. 12, AAPG Bulletin.

Roumboutsos, A., "The Application of Deconvolution in Well Test Analysis", Abstract 1989:20444, Dissertation, Jul. 1989, Heriot Watt University.

Schutjens, P., "On the Stress Change in Overburden Resulting from Reservoir Compaction: Observations from Two Computer Models and Implications for 4D Seismic", May 2007, pp. 628-634, The Leading Edge.

* cited by examiner

METHOD FOR MODELING DEFORMATION IN SUBSURFACE STRATA

CROSS REFERENCE TO RELATED APPLICATIONS

This application is a Continuation-In-Part of U.S. application Ser. No. 12/665,597, filed 18 Dec. 2009, which issued as U.S. Pat. No. 8,423,337 on 16 Apr. 2013, which claims benefit of International Application No. PCT/US2008/007238, filed 10 Jun. 2008, and U.S. Provisional Application No. 60/966,031, filed 24 Aug. 2007, and which is incorporated herein in its entirety for all purposes.

FIELD OF THE INVENTION

The present invention relates to the field of geomechanical modeling. More specifically, the present invention relates to modeling of deformation in subsurface strata, such as deformation induced by thawing of permafrost in areas having sub-freezing ambient temperatures.

BACKGROUND OF THE INVENTION

Discussion of Technology

As the world's demand for fossil fuels increases, energy companies find themselves pursuing hydrocarbon resources located in more remote and hostile areas of the world. Such areas include Arctic regions and other regions where ambient temperatures reach well below the freezing point of water.

A characteristic of Arctic regions and certain other cold regions of the world is the presence of permafrost. Permafrost refers to extended soil layers that remain in a substantially frozen state. The soil layers may comprise layers of silt, layers of sand, and possibly some intermixed layers. The presence of frozen water in these soil layers creates solid, rock-like masses that may extend from a few feet to even 2,000 feet below the surface.

As the name implies, permafrost is perennially frozen ground. However, in some instances permafrost includes a thin active layer along the surface that seasonally thaws during the summer.

A problem may arise in connection with hydrocarbon production activities in areas of permafrost. That problem relates to unintended thawing of the permafrost layers. As warm hydrocarbons are produced from deeper subsurface layers, they travel upward through production tubing or other fluid conduit. The warmth of the fluids radiates through the fluid conduit and into the surrounding permafrost layers. This, in turn, causes the permafrost layers to reach temperatures above the point where ice begins to melt.

In a frozen state, permafrost behaves like one or more rock layers beneath the surface. In this respect, the frozen layers are solid and create geomechanical forces that act downwardly against lower rock strata. A state of geomechanical equilibrium is reached where the permafrost layers and the rock layers therebelow are generally static. However, when interstitial ice within the permafrost layers begins to melt due to thermal energy from production fluids, the state of geomechanical equilibrium begins to change.

First, the upper layers representing the permafrost are no longer solid, but enter a liquid phase. This creates subsidence at the earth surface. In addition, as the permafrost transforms to softer material below the earth surface, a reduction in thickness takes place within the permafrost layers. This, in turn, leads to stratum deformation.

Second, the upper layers representing the permafrost no longer provide the same tectonic force acting downwardly against the lower rock strata. The weight of the mass is the same, but the forces are changed. This means that dilation in the lower rock layers may occur. This also leads to stratum deformation.

The process of deformation that takes place in subsurface strata as permafrost thaws creates changes in stress patterns below the earth surface. In this respect, subsurface formations are confined by a state of in-situ tectonic stress. A well that is completed through the permafrost layers is exposed to geomechanical stresses. Such stresses may cause damage to the production tubing and related equipment. Stresses are potentially greatest at the depth between layers of compression and layers of dilation. When the stresses exceed the point of elastic deformation for the production equipment, permanent damage to the equipment occurs.

It is desirable to be able to model deformation in subsurface strata in order to anticipate potential stresses on production equipment. This, in turn, assists the operator in designing and completing a well that is more resistant to deformation-induced stresses. Such a model would account for both thermal and geomechanical changes in subsurface rock layers.

It is also noted that a hydrocarbon-bearing reservoir below the permafrost layer resides in a state of pressure due to the presence of fluids within interstitial pore spaces. The in situ hydrocarbons provide pore pressure which acts against the overburden and supports the rock strata and frozen soil layers above the formation. As hydrocarbons are produced from the reservoir, the stress state of the reservoir may change. When the state of stress within and above the hydrocarbon-bearing reservoir exceeds the mechanical limits of wells completed in the production area, the completion assemblies forming the wells may be further damaged. Thus, there are forces at work against the production equipment in addition to permafrost thaw associated with hydrocarbon recovery processes.

It is desirable to utilize a computer-based simulation that allows the reservoir analyst to simulate changes in soil layer thicknesses based on anticipated changes in formation temperature. A need further exists for an improved method for modeling a reservoir that takes into account changes in geomechanical stress over the life of a reservoir. In addition, a need exists for a method for modeling deformation in subsurface strata incident to production-induced thaw of permafrost that accounts for both initial in-situ stress and heat transfer analysis. Still further, a need exists for an improved geomechanical modeling method that automatically builds a three-dimensional map-based grid from subsurface data, and then converts the map-based grid into a finite-element-based model.

SUMMARY OF THE INVENTION

A computer-implemented method for modeling deformation in subsurface strata within a geomechanical system is provided. Preferably, the geomechanical system is a hydrocarbon reservoir.

In one aspect, the method comprises defining physical boundaries for the geomechanical system. The method also includes acquiring one or more mechanical properties of the subsurface strata within the physical boundaries, and acquiring one or more thermal properties of the subsurface strata within the physical boundaries. The mechanical properties may be, for example, Young's modulus, Poisson's ratio, thermal expansion coefficient, or combinations thereof. The thermal properties may be, for example, temperature, thermal conductivity, specific heat, latent heat of fusion, or combinations thereof.

The method also includes the step of creating a finite element mesh representing the geomechanical system. The mesh defines a plurality of nodes representing points in space. Each node has potential displacement in more than one direction, and is populated with at least one of each of the mechanical properties and the thermal properties.

The method also includes providing a computer-implemented finite element analysis program for the finite element mesh. The program solves for in situ stress at selected nodes within the mesh. From there, the method comprises running the finite element analysis program a first time in order to acquire in situ stress values within the geomechanical system at selected nodes at an initial time. This serves to initialize a geostatic condition of the geomechanical system. The finite element analysis program is then run a second time in order to acquire in situ stress values within the geomechanical system at selected nodes at a subsequent time in response to changes in at least one of the mechanical or thermal properties.

In one embodiment, the method further includes creating a thermal analysis module. The thermal analysis module correlates changes in the one or more thermal properties within the subsurface strata to changes in mechanical properties of the subsurface strata within the physical boundaries. For example, changes in thermal properties within the subsurface strata may cause changes in mechanical properties. The method then includes imposing the thermal analysis module into the finite element analysis program so that projected changes in the one or more thermal properties affect in situ stress values within the subsurface strata.

It is preferred that the in situ stress values obtained from running the finite element analysis program a second time place the geomechanical system at geostatic equilibrium.

In one aspect of the method, certain variables are entered into an initial geomechanical analysis module as part of the finite element mesh program when the finite element mesh program is run the first time. These variables include (i) far-field boundary conditions, (ii) specific gravity, and (iii) initial temperature in the subsurface strata. These same variables may also be entered into an initialized geomechanical module as part of the finite element mesh program when the finite element mesh program is run the second time.

The method has utility in assisting the completion engineer in determining what type of casing or other downhole equipment to use in a wellbore. Thus, in one aspect the method includes analyzing the in situ stress values at the subsequent time in order to select one or more items of wellbore equipment to be placed in the permafrost layer in order to minimize the prospects of damage as a result of an increase in temperature.

The method has particular application to modeling subsurface deformation in regions of permafrost. Thus, in one aspect the subsurface strata comprises a permafrost layer, and the in situ stress values obtained from running the utility program a second time are a result, at least in part, of changes in temperature within the permafrost layer. The changes in temperature within the permafrost layer may be caused, for example, by the transport of production fluids through the permafrost layer over a period of time. In this instance, the change in temperature would be an increase in temperature within the permafrost.

Changes in temperature may produce (i) displacement in the subsurface strata, (ii) increased strain in the subsurface strata, or (iii) combinations thereof. Preferably, the finite element analysis program generates a projected displacement history and a projected strain history of the subsurface strata in response to a simulated increase in temperature within the permafrost layer.

In one embodiment, prior to running the finite element analysis program the first time, the geostatic condition of the geomechanical system is further initialized based upon (i) data from leak-off tests from wells drilled within the physical boundaries, (ii) well logging data taken from wells drilled within the physical boundaries, (iii) records of sand production from wells completed within the physical boundaries of the geomechanical system, (iv) completion test records from wells completed within the physical boundaries, or (v) combinations thereof. Alternatively or in addition, prior to running the finite element analysis program the first time, the geostatic condition of the geomechanical system is further initialized by reviewing a history of casing failures from wells within the physical boundaries of the geomechanical system.

BRIEF DESCRIPTION OF THE DRAWINGS

So that the manner in which the present invention can be better understood, certain drawings and flowcharts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION

Definitions

Figure 1:
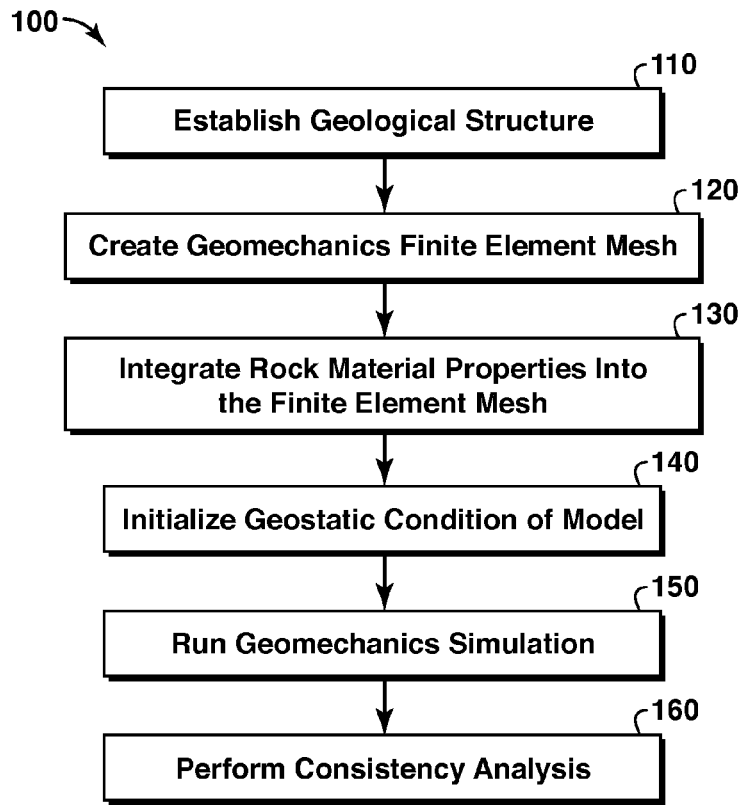
FIG. 1 is a flow diagram illustrating a geomechanical modeling method according to one embodiment of the invention.

As used herein, the term "burial" refers to a geologic process, whether continuous or discontinuous, and whether related to sedimentary deposition, volcanic eruption and/or other geologic process wherein multiple strata are placed in a substantially successive manner, one stratum atop another, in a corresponding series of stratum-producing phases leading to a formation's creation. As used herein, where the term "burial" is associated with a rock property value (e.g., Poisson's Ratio or Young's Modulus) for a stratum of interest, the term designates a virtual value of the rock property for each stratum considered pertinent to developing a stratigraphic model suitable for performing the desired stress analysis of the formation. Depending on the formation, the oldest stratum and the successively newer strata of interest can be produced in any one of the primary geologic eras.

"Lithology" means a description of the physical and approximate compositional character of a rock based on a variety of rock attributes, including without limitation, color, structures, grain size and mineralogic components. One or more of these attributes may be determined by visual evaluation (by eye alone or assisted by a magnifier), seismic interpretation and/or well log interpretation.

"Strain" means a measure of the extent to which a body of material is deformed and/or distorted when it is subjected to a stress-inducing force. "Stress-Inducing Force" refers to an action of at least one force, load and/or constraint on a body of material that tends to strain the body. Examples of the body's deformation or distortion can include, without limitation, changes in the body's length (e.g., linear strain), volume (e.g., bulk strain) and/or a lateral displacement between two substantially parallel planes of material within the body (e.g., shear strain).

"Stress" is a measure of inter-particle forces arising within a body of material resisting deformation and/or distortion, in response to a stress-inducing force applied to the body, as particles within the body of material work to resist separation, compression and/or sliding.

"Principal Stress" means any one of three inherent normal stresses, each perpendicular to the other, in a predetermined coordinate system where the three corresponding shear stresses are equal to zero. Generally, though not always, one of the principal stresses is substantially vertical in a formation, while the two remaining principal stresses are substantially horizontal. While there is no requirement for the principal stresses to be vertical or horizontal, for ease of discussion herein, the three principal stresses, are referred to as principal vertical stress, $\sigma_{vert}$, greater principal horizontal stress, $\sigma_{horiz-1}$, and lesser principal horizontal stress, $\sigma_{horiz-2}$.

"Poisson Ratio," or "$v$," means, for a substantially elastic body of material when placed under a substantially uniaxial stress, the ratio of the strain normal to the uniaxial stress to the strain parallel to the uniaxial stress.

"Elastic stress to-strain modulus" means a ratio of stress applied to a body versus the strain produced. Elastic stress-to-strain moduli include, without limitation, Young's Modulus, ("E"), bulk modulus ("K"), and shear modulus ("$\mu$").

"Young's Modulus" ("E") means, for a substantially elastic body of material when placed under a substantially uniaxial stress less than the material's yield strength, whether a tension or compression stress, the ratio of the uniaxial stress, acting to change the body's length (parallel to the stress), to the fractional change in the body's length.

"Elastic" means a body of material capable of sustaining deformation and/or distortion without permanent loss of size or shape in response to a stress-inducing force, whether the body's response is linear elastic or non-linear elastic.

"Inelastic" or "Plastic" means that any deformation and/or distortion to a body of material subjected to a stress-inducing force is permanent, i.e. deformation/distortion remains after the force is removed.

"Yield Strength" means the stress value at which deformation resulting from a stress-inducing force becomes permanent. At that stress value, a body of material, which previously exhibited an elastic response, will begin to exhibit a plastic response to the stress-inducing force.

"Subsurface" means beneath the top surface of any mass of land at any elevation or over a range of elevations, whether above, below or at sea level, and/or beneath the floor surface of any mass of water, whether above, below or at sea level.

"Formation" means a subsurface region, regardless of size, comprising an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation may contain numerous geologic strata or layers of different ages, textures and mineralogic compositions. A formation can refer to a single set of related geologic strata of a specific rock type, or to a whole set of geologic strata of different rock types that contribute to or are encountered in, for example, without limitation, (i) the creation, generation and/or entrapment of hydrocarbons or minerals and (ii) the execution of processes used to extract hydrocarbons or minerals from the subsurface.

"Tectonic" means pertaining to, causing or arising from a subsurface region's movement and/or deformation, whether by vibration and/or displacement, including, without limitation, rock faulting, rock folding and/or a volcanic event.

"Calibrated" means to bring a numerical model to a state consistent with observed conditions within a degree of deviation acceptable for the desired analysis. For example, a formation model may be calibrated to a state of virgin stress distribution (i.e., before any man-induced, stress-altering event occurs in the formation). It will be understood, however, that a model can be calibrated to another stress state of interest including, without limitation, a formation's present-day, non-virgin stress distribution, by first calibrating to a virgin stress distribution based on stress data obtained (i) from at least one location in the formation not materially affected by the man-induced event and/or (ii) before the man-induced event occurred in the formation. Once a formation is calibrated to its virgin stress distribution, any man-induced, stress-altering events can then be accounted for to bring the model to a present-day, non-virgin stress distribution.

DESCRIPTION OF SELECTED SPECIFIC EMBODIMENTS

FIG. 1 presents a flow diagram illustrating a geomechanical modeling method 100 according to one embodiment. The method 100 sets out steps that may be followed for the purpose of developing a numerically tractable, multi-scale geomechanical modeling framework suitable for computer simulation.

In accordance with the method 100, a first step is to establish a geologic structure for the reservoir under study. This step is represented by Box 110. The purpose is to create a three-dimensional, map-based model from subsurface data.

In creating the geologic structure 110, the geologist or engineer (sometimes referred to generically herein as "the analyst") acquires one or more types of subsurface data. Such data may include well logging data, seismic data, or reservoir simulation data. The analyst then applies certain computer-implemented tools to generate a map representing the geological structure of the production area.

Figure 2:
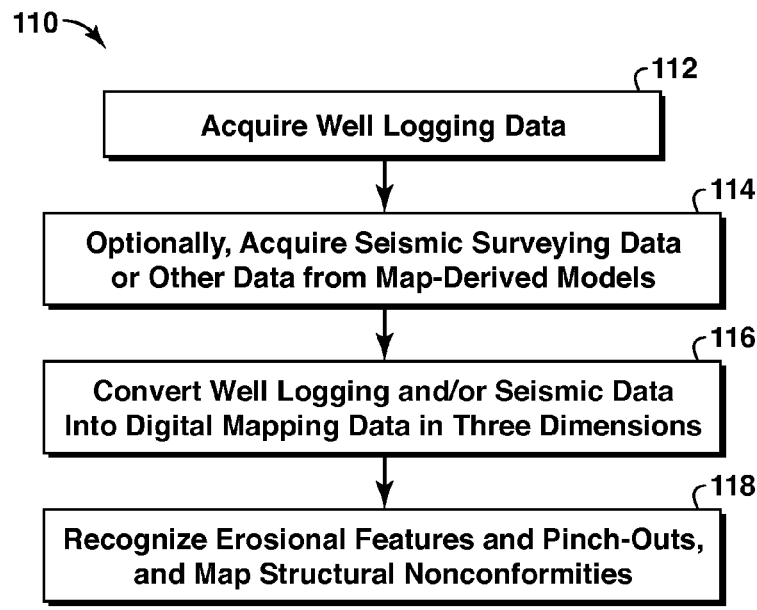
FIG. 2 is a flow diagram illustrating steps for establishing the geologic structure for the geomechanical modeling method of FIG. 1, in one embodiment.

Preferred steps for creating the geologic structure 110 are generally outlined in FIG. 2. FIG. 2 provides a flow diagram illustrating steps for establishing the geologic structure for the geomechanical modeling method of FIG. 1, in one embodiment.

As indicated in FIG. 2, the analyst may acquire well logging data. This step is shown at Box 112. One of ordinary skill in the art will understand that a well log relies upon a sensing device that is run down a wellbore, typically on a wire line. Well logs provide interpretative evidence as to the make-up of a formation as a function of depth. Examples of well logs that might be employed in step 112 to create the geological structure 110 include gamma ray logs, density logs, resistivity logs, porosity logs and sonic logs.

The analyst may also acquire data from "map-derived models." This is shown in Box 114 of FIG. 2. Map-derived models would typically include data that exists from field-wide surveys. Such surveys may include well logging data from wells around the field. However, such data primarily includes seismic surveys across an area under study.

In the step of establishing the geologic structure 110, the analyst will take the well log and/or seismic data and convert it into a digital representation of a subsurface area. This is shown in Box 116 of FIG. 2. Preferably, the data from the seismic surveys and well logging data is input into a known geological gridding program. An example of such a program is FloGrid™ offered by GeoQuest of Houston, Tex. GeoQuest is the software division of Schlumberger Information Solutions (SIS), an operating unit of Schlumberger OilField Services. The FloGrid program is described in U.S. Pat. No. 6,106,561 which is incorporated herein by reference in its entirety.

FloGrid™ is most typically used as a "pre-processor" for reservoir analysis. FloGrid™ constructs fluid-flow simulation grids for use in a reservoir simulator such as Schlumberger's ECLIPSE™ program. Reservoir data such as the porosity and permeability of the rock matrix is loaded into the program, and a simulation grid is created for the reservoir simulator.

A reservoir simulator, in turn, creates a mathematical model of a reservoir. In operation, a designated reservoir volume is divided into a large number of interconnected cells. The average permeability, porosity and other rock properties are then estimated for each cell. The process makes use of data from well logs, seismic surveys, and rock cores recovered when wells are drilled. Production from the reservoir can then be mathematically modeled by numerically solving a system of three or more nonlinear, partial differential equations describing fluid flow in the reservoir.

In the method 100, the geological gridding program is being used as a map-based model for the geological structure 110. However, the map-based model will not be entered into a traditional reservoir simulator; rather, as will be described more fully below, the geological structure 110 created from the map-based model will be converted into a finite element model. In this way, the effects of changes in temperature and pore pressure on geomechanical stress can be modeled.

The grid that is created from the elements by FloGrid™ (and other known geological analysis software programs) is generally horizontal. This means that a two-dimensional map is created based upon the subsurface data that is loaded into the pre-processor. In other words, the data is used to create a two-dimensional representation of the production area under study at a selected depth. However, a multi-scale or three-dimensional grid is not automatically created.

It is known to create a three-dimensional map from a pre-processor program output by stacking a series of two-dimensional grid representations generated by the program. However, this is a manual process that tends to be very time-consuming. In practice, the analyst acquires logging data from various exploratory wells. Depth corrections may be made, and the well logs are then used to identify strata and perform depth correlations between wells. Subsurface structures or faces may then be mapped through a process of manually stacking layers.

An improved geomechanical modeling method is offered herein that automatically builds a three-dimensional map-based model from subsurface data, and then converts the map-based model into a finite-element-based model. The present method 100 employs, in one aspect, a modified pre-processor that includes an automatic stacking function. This means that the conversion step 116 automatically creates a three-dimensional model from the survey data without having to manually stack sequential horizontal layers.

The modified pre-processor developed for Box 116 can stratify the subsurface formation under study and map properties that are common to wells. Optionally, the modified pre-processor can also derive properties such as elastic constants, cohesion, P-wave velocity, S-wave velocity, porosity, and permeability in order to provide a mechanical description of the layered structure that has been upscaled from a two-dimensional model.

To prepare the three-dimensional model, the layer structure and layer properties are derived from the well logging data obtained in step 112 and the seismic survey data obtained in step 114. The data is correlated with depth, and then merged with the modified pre-processor software to create the geological structure 110. In this manner, a three-dimensional map is automatically created. The map includes data at various strata including, for example, porosity, permeability, temperature and pressure.

In order to provide the automatic three-dimensional conversion, an ASCII Data-to-ZMap programming function may be used. ASCII is an acronym for "American Standard Code for Information Interchange." This is a character encoding program based on the English alphabet. In general, ASCII is a seven-bit code, meaning it uses bit patterns represented with seven binary digits (a range of 0 to 127 decimal) to represent character information.

The character information is converted to a ZMap file format. "ZMap" is a name given to a particular industry file format having its own characteristic header information. Header information describes the size of the domain, that is, the min-x, the max-x, the min-y, and the max-y. This, in turn, is a reference to the offset from some global reference coordinate in a given plane or depth. The ZMap program provides a corresponding "z" coordinate value for each reference point within the plane. The "z" coordinate value corresponds to elevation or surface changes at the various locations within the plane. Thus, the ZMap format places the coordinate data in a particular format such that a description is provided in three dimensions, to wit, "x," "y" and "z."

It is also noted that when a two-dimensional grid is created by FloGrid™ or other geological analysis software, the mesh is not only horizontal, but is also in the form of a very thin layer. When the collective thin layers of meshes are stacked under a known manual technique, the new three-dimensional mesh does not accurately recognize erosional features and pinch outs that may naturally exist in the reservoir. This is because in the usual oil reservoir simulation, the gridding program seeks to represent properties of the reservoir by using a mathematical function which gradually changes according to the position within the reservoir boundaries. However, it is difficult to force these functions to approximate changes in the properties which occur very abruptly as a result of geological features within the reservoir. For instance, a reservoir may have two distinct layers, each of which has a substantially different value for a given property (e.g., porosity) at the boundary between these two layers. A mathematical function representing the value of the properties might therefore have to make an immediate transition from one value to the other at the boundary between the layers. Therefore, in certain embodiments of the methods herein, the geomechanical model accounts for pinchouts and erosional features in the subsurface layers. This is indicated in FIG. 2 by Box 118.

Figure 3:
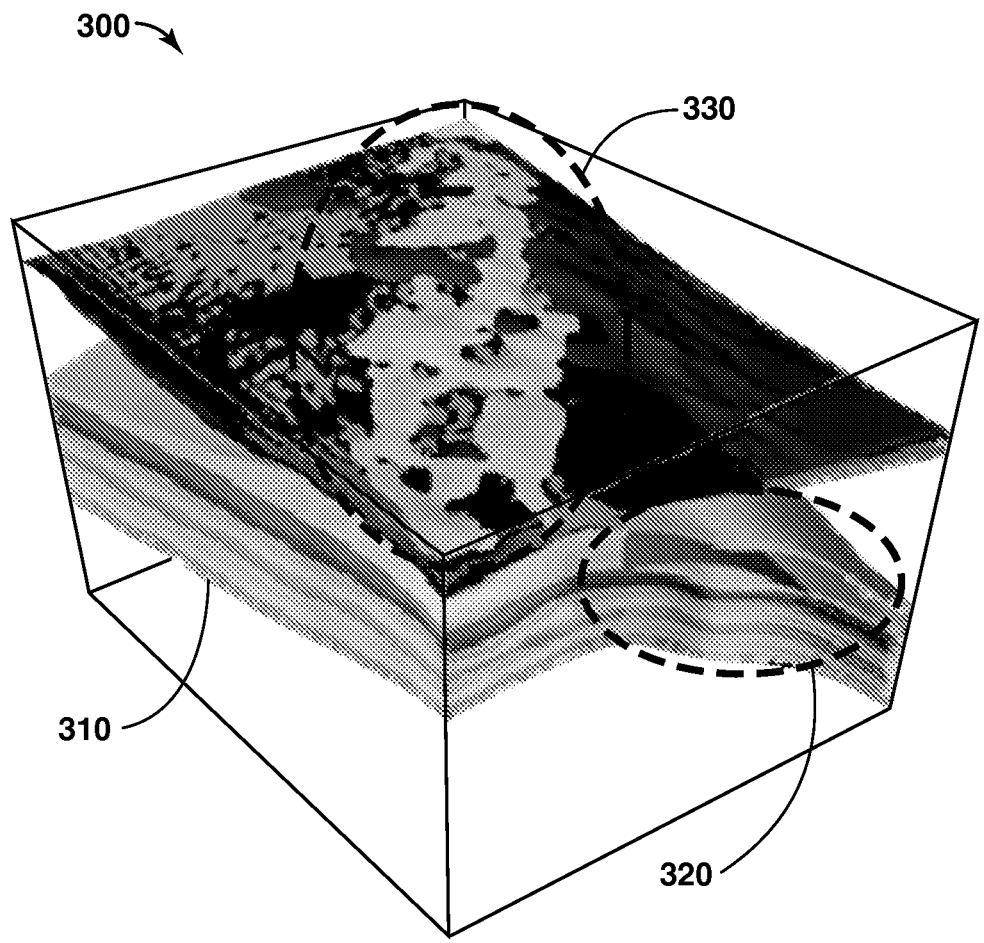
FIG. 3 is a sectional view of an illustrative oil reservoir which is being modeled. The oil reservoir is the product of survey data that has been taken from geologic structures and translated into stratigraphic layers. A series of stratigraphic layers is seen.

FIG. 3 is a cross-sectional view of an illustrative oil reservoir 300 which is being modeled. The oil reservoir 300 is the product of survey data that has been taken from geologic structures, and translated into stratigraphic layers 310 in accordance with steps 112-116. A series of stratigraphic layers 310 is seen in FIG. 3.

In FIG. 3, the layers 310 include an area of "pinchout" 320. In addition, the layers 310 include erosional features 330. Pinchouts and erosions, or vanishing layer thicknesses, may arise from tectonic forces within the earth and from erosion. The presence of pinchouts 320 and erosive zones 330 makes it more difficult for an analyst to develop a numerically tractable geomechanical model for field-wide computer simulation. Indeed, correcting numerical singularities with human interactions, even aided by existing CAD (computer aided design) tools, can be prohibitively time consuming for generating accurate computer models. Therefore, an optional aspect of the geomechanical modeling method 100 is to recognize erosional features and pinch outs and to map such structural nonconformities as done in FIG. 3.

To take into account structural nonconformities, a process has been developed to sort through the depth of the geologic structures and to identify geologic singularities such as pinchouts 320 and erosion features 330. Once such features 320, 330 are identified, correct depth ordering is restored. In addition, using the modified pre-processor, regions of zero thickness are assigned with a positive volume along with flow and structural properties that approximate the singular features.

In order to identify geological nonconformities, the modified pre-processor checks the nodes created from the map-based geological model 110. Checks are conducted at incremental locations to determine whether the depth represents an increasing order. If the order is non-increasing, this indicates that some of the nodes penetrate to other layers. This signifies an erosive zone. On the other hand, if there are nodes having the same depth, this indicates a collapse. This, in turn, signifies a pinchout. When either of these conditions is determined, the elements have a zero thickness. To correct for the nonconformity, the element is given a positive thickness. This provides for volume.

In operation, the modified pre-processor interpolates points in the ZMap format from the map-derived model in order to provide additional data points for building the three-dimensional structure 110. The Z-map file also produces collapsed nodes where unconformities, pinch-outs and erosive zones occur. Positive volume is then accorded to these collapsed nodes to correct for unconformities, pinch-outs and erosive zones.

In order to create a mesh acceptable for finite element analysis (discussed below in connection with Box 120), the pre-processor should scan all nodes in the x- and y-directions through the depth of the geomechanical system to identify these nodes. When these singular nodes are identified, an appreciable pinch-out relief distance must be given to create elements of positive volume. Stated another way, the pre-processor separates the nodes by a given thickness in the vertical direction between two nodes. This process is repeated until all the nodes are separated from each other. Consequently, all elements are assigned a positive volume.

It is noted that the grid, or map-based model, that is generated from the modified pre-processor represents data that resides in a digital domain. In other words, as a result of establishing the geologic structure 110, a subsurface structure is mapped and discretized in a particular domain. That domain has certain local coordinates within the domain. Boundaries are provided at the outer edges of the domain. The boundaries are defined by certain parameters referred to as boundary conditions. Such parameters for an oil reservoir simulation may include the formation pressure and temperature history. This information may be generated from the subsurface data acquired in the steps 112 and 114. This information may also be obtained from other reservoir flow simulations. Such information may be adopted as sets of boundary conditions for the geologic structure 110.

It is desirable to represent the local coordinates and boundary conditions in the geological structure 110 in terms of nodes within a finite element analysis domain. In this way, geomechanical modeling can be conducted. Thus, referring back to FIG. 1, a next step in the modeling method 100 is the creation of a finite element mesh. This step is illustrated at Box 120. The purpose of step 120 is to take the grid representing the geologic structure 110 (a map-based model) and convert it into a mesh 120 for finite element analysis.

Finite element analysis involves the representation of individual, finite elements of a geological system in a mathematical model. A predetermined set of boundary conditions is provided for the geological system. Changes to the geological system are predicted as a solution to the mathematical model as fluid pressures and/or temperatures change within the system.

In finite element modeling, the region that is to be analyzed is broken up into sub-regions called elements. The process of dividing a production area under study into sub-regions may be referred to as "discretization" or "mesh generation." A mesh is a collection of elements that fill a space, with the elements being representative of a system which resides in that space. The region that is to be analyzed is represented by functions defined over each element. This generates a number of local functions that are less complicated than those which would be required to represent the entire region.

Figure 4:
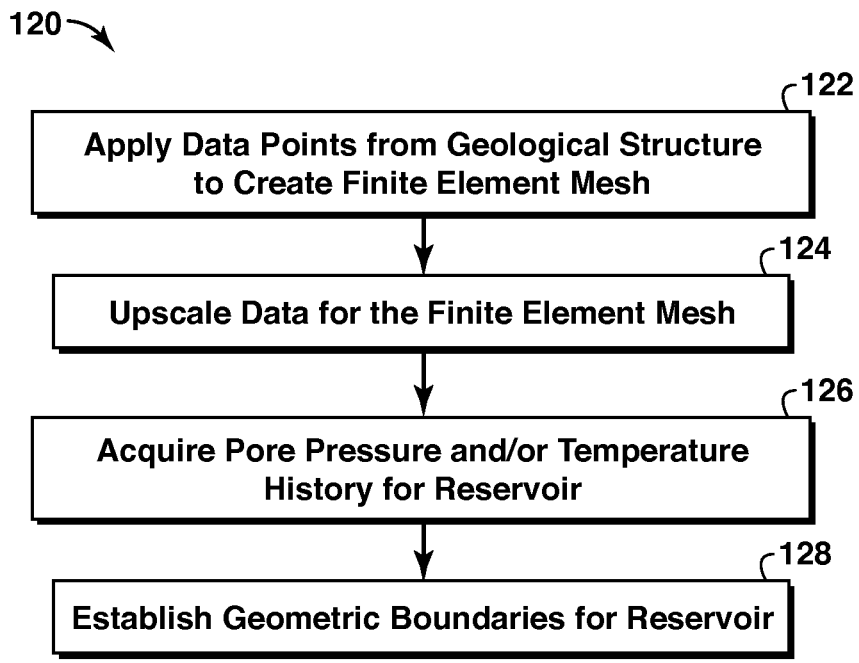
FIG. 4 is a flow diagram illustrating steps for creating a geomechanics finite element mesh from the geomechanical modeling method of FIG. 1, in one embodiment.

FIG. 4 presents procedures in connection with step 120. Under step 120, a geomechanics finite element mesh is created. In order to create the finite element mesh 120, data points are taken from the geologic structure 110, and then input into a utility program. This is shown at Box 122 of FIG. 4.

In creating the new mesh 120, the production history is first considered. The production history, which includes pressure and temperature mapping, is carried out using a weighting algorithm. The weighting algorithm relies upon search volumes. Preferably, the search volumes are ellipsoids. This means that a search ellipsoid is defined around each node. Ellipsoids (such as in the shape of a football) are preferred because the reservoir thickness is small compared to the other two dimensions. This gives the user the flexibility to approximate most volumes by adjusting its semi-axes. For example, the ellipsoid equation may be modified to a plane domain by assigning larger semi-axes in the in-plane directions, and smaller values in the thickness direction. However, it is understood that other search volumes such as cylinders may be used as part of the algorithm.

The algorithm uses a distance-space weighted function to find a base value to represent the pore pressure (or other reservoir characteristic) in the geomechanical model. In other words, the weighting scheme is based on distance between the geomechanical node and the reservoir analysis node. In the preferred embodiment, a three-dimensional weighting scheme is formulated whereby nodal quantities for the geomechanical simulation 110 are mapped from a spatial neighborhood of reservoir simulation gridpoint quantities. The reservoir simulation gridpoints are known for their pressure and temperature from the pre-solved reservoir analysis.

In operation, the weighting scheme calculates the nodal quantity "p(r)" in the geomechanical model based on the nodal quantity "$P_i$" from the reservoir analysis gridpoints through the following equation, $$p(r) = \frac{\sum_i w_i P_i}{\sum_i w_i}$$

in which $$\frac{1}{w_i} = \frac{(r_x - \xi_x)^n}{a^n} + \frac{(r_y - \xi_y)^n}{b^n} + \frac{(r_z - \xi_z)^n}{c^n}$$

wherein:
r is the position vector of a geomechanical node;
$r_x$, $r_y$, and $r_z$ are the "x," "y," and "z" position vectors of the reservoir analysis nodal position vectors, respectively;
P is a nodal quantity for a property at reservoir analysis gridpoints;
p is a nodal quantity for a property in the geomechanical model;
a, b, and c are the semi-axes of the three principal directions of a searching ellipsoidal domain in the "x", "y", and "z" directions, respectively;
$\xi$ is the reservoir analysis nodal position vector;
$\xi_x$, $\xi_y$, and $\xi_z$ are the "x", "y", and "z" components of reservoir analysis nodal position vectors, respectively;
n is the exponent of weighting; and
$w_i$ is the distance based weight.

The reservoir characteristic is mapped based on the property "P" (e.g. pressure or temperature) of the surrounding reservoir analysis gridpoints inside the searching ellipsoid.

It should be noted that in many cases, the volume of data used in a geologic model is much greater than what is needed or desired in creating a finite element model. Therefore, one optional aspect to the step 120 is "upscaling" or reducing the amount of data while maintaining an accurate mathematical description. This is shown in Box 124. Upscaling is an integral feature to most gridding programs, including FloGrid™.

The purpose for creating the finite element mesh 120 is to determine movement of the rock matrix within the reservoir under study in response to changes in fluid pressure. In addition, movement of the rock matrix within the reservoir in response to changes in temperature may be determined. Finite element analysis allows the analyst to determine the response of the "elements" to changes in the geomechanical system. In order to meet this purpose, the pore pressure and, optionally, the temperature within the reservoir is initialized at various points. In practice, information concerning pore pressure history inside the reservoir is acquired. The step of acquiring historical pore pressure data is indicated in Box 126.

The known points of data are referred to as "nodes." Each of the nodes is mathematically provided with one or more degrees of freedom. This is part of the "discretization" or "mesh generation" process. The degrees of freedom represent permitted movements in the rock in response to changes in fluid pressure during production or injection. These may also be referred to as "Gaussian integration points." A mathematical approach is taken to describe how each point or node displaces relative to each node for a given initialized state.

In addition, the reservoir has physical boundaries. Boundaries are provided at the outer edges of the domain. These are referred to herein as geometric boundaries. The step of establishing boundaries for the geomechanical model is indicated at step 128. The step 128 of establishing boundaries involves determining the geographic extent of the strata under study. This includes both the aerial dimensions and the depth.

The boundaries have known (or approximated) pore pressure values and geomechanical properties. The pore pressure and geomechanical values at the geometric boundaries represent at least part of the "boundary conditions."

A next step in the geomechanical modeling method 100 is the input of rock material properties into the finite element mesh 120. Rock material properties refers to the lithology of the rock as well as its permeability, its porosity, its elasticity, and other features. The step of inputting rock material properties is shown at Box 130 of FIG. 1.

A variety of tools may be used to acquire information concerning rock material properties. One source of data is core test data. Core test data refers to data taken from core samples. This may include rock lithology, porosity, and permeability. Various tests may be run on core samples in order to acquire this information. Core samples are considered the most useful source of rock data since they provide tangible and physical information concerning the make-up of subsurface rock formations at given depths.

Loading tests may also be performed in order to determine the rock's elastic properties. Typical tests include cyclic conventional geomechanics tests, uniaxial tests, or triaxial tests. The tests may be performed on the core samples in both drained and un-drained conditions, that is, in both dry and saturated conditions. For example, a sample may be taken to failure under load to determine failure properties so as to map the rock in a Mohr Coulomb or Drucker-Prager analysis. Such analyses may provide Young's modulus, Poisson's ratio, Lame' constants, rock density and other rock properties that may be calculated according to formulae known by those skilled in the art of geomechanics. Other "critical state" models such as the Cam-clay model are known and may also be used. In any instance, the rock material/property model 130 is constructed using either elastic or elastoplastic models based on the analyst's judgment.

In connection with an evaluation of geomechanical stresses and failure criteria, it is generally recognized that rocks are strong in compression but weak in tension. This is particularly true for rocks with natural fractures. For these rocks, compressive stresses will tend to leave fractures closed, but tensile stresses will open the rock and encourage fracture growth. By this criterion, any portion of a rock subjected to tensile stress is likely to fail. Tensile stresses may come into play in an overburden where fluid is removed from a subsurface formation.

In practice, failure points are determined by breaking core samples in compression under different confining pressures. The uniaxial and triaxial compression laboratory test procedures and calculations used to define the failure line in a Mohr-Coulomb analysis are known to those of ordinary skill in the art of geomechanics. When considering porous rocks with an internal pore fluid under pressure, the stresses correspond to "effective stresses." The "effective stress" on a porous rock is the normal total stress minus the pore fluid pressure. The concept of "effective stress" and its use is also known to those skilled in the art.

Well log data is also used to assess rock material properties. Data derived from well logs may inform as to both rock makeup and elastic properties. For example, gamma ray logs and density logs are useful in determining the amount of shale in a rock, which infers the presence of clay. Sonic logs can be used to calculate elastic properties. Porosity logs may also be used for porosity determinations.

It is noted that the geomechanical modeling method 100 may employ constitutive models when analyzing rock properties 130. A constitutive model takes into account the fact that certain properties normally considered to be constant, such as porosity, may change in response to other factors such as stress or strain or temperature. Constitutive behavior represents a modeling framework which captures the evolution of a particular material property over time. The constitutive model provides a mathematical model that describes how those properties evolve as a function of some other parameter, usually in time.

In the context of the utility program for the finite element mesh 120, the constitutive model may be prepared by assigning the Young' modulus, Poisson's ratio, initial yield stress, friction angle, plastic hardening curve, or other factors compiled from laboratory core test results. The selected values are assigned to the finite element mesh.

For a formation under geomechanical study, the formation thickness is also an important parameter. The initial thicknesses of rock layers may be determined through both well log data and seismic data. The thickness of the formation may change in response to depletion-induced changes in the stress, strain, changes in temperature, or other factors.

Geomaterials also exhibit pressure-dependence. Therefore, mathematical framework of the finite element mesh also takes into account the failure mode of the rock. For example, if the rock is elastic it is generally going to reform back to its original shape in response to stress. However, if the rock is plastic it is more likely to shear in response to stress. The failure mode may also take into account whether a particular rock may shear under compression, or form shear bands. The response of a rock matrix may be calibrated with laboratory tests to determine response for plastic behavior or nonlinear elastic behavior. The failure mode may be analyzed mathematically using geomechanical properties, such as the Mohr-Coulomb/Drucker Prager failure criteria.

As noted above, a utility computer program is offered which incorporates repair capabilities to convert the geologic structure 110 into the finite element geomechanical model 120. Two constitutive material models are preferably given to these two layers. The constitutive models may be elastic models or elasto-plastic models. The governing equation then incorporates these two material models into sets of equations to be solved. The compatibility and force (flux) equilibrium will be satisfied as the equations are solved.

A next step in the geomechanical modeling method 100 is geostatic initialization. This step is indicated at Box 140. The purpose of this step 140 is to initialize the geomechanical condition of the formation at issue.

Figure 5:
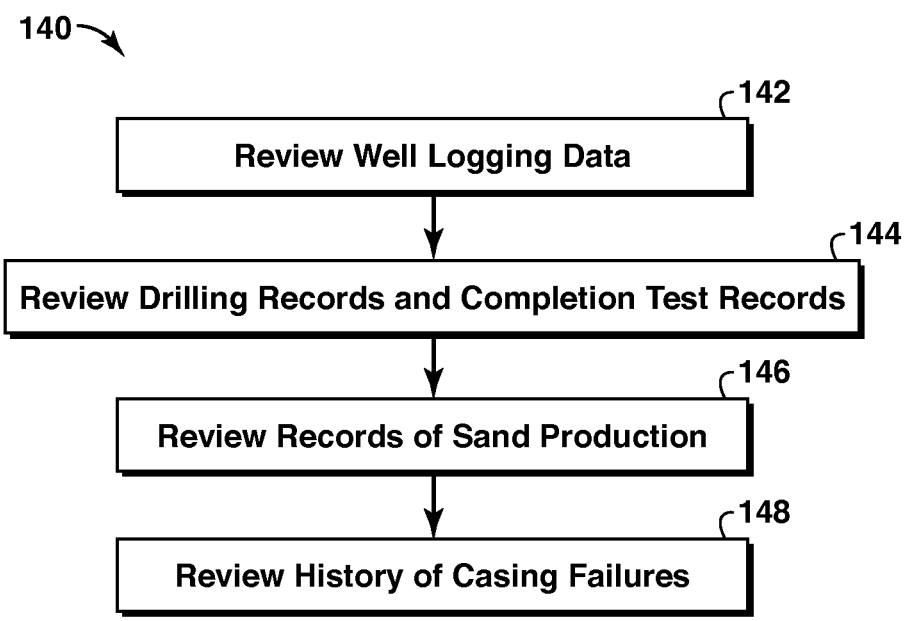
FIG. 5 is a flow diagram illustrating steps for initializing the geostatic condition of the geomechanical modeling method of FIG. 1, in one embodiment.

FIG. 5 provides a flow chart that outlines data considered in connection with the geomechanical initialization step 140. First, various well logging data may be used. This is shown at Box 142. Examples of well logs that may be consulted include density logs, FMI logs and caliper logs.

Density logs inform the analyst as to the density of the formation under study. This is useful as it is used to distinguish the producing and non-producing layers.

FMI logs, or "formation microimaging" logs, detect fractures within the formation. Such fractures may either be naturally occurring fractures, or may be induced by fluid pressures inherent in the drilling process. FMI logs are instructive as they indicate the strength of the rock formation.

Finally, the caliper log measures the radius of a wellbore as a function of depth. The caliper log can provide an indication of washouts, borehole collapse, or other drilling-induced variations in radius. This also may be indicative of rock strength.

Next, the analyst may consider drilling records and completion test records. This is shown at Box 144. Drilling records may record instances of fluid loss or "lost returns" during wellbore formation. This, in turn, is also indicative of formation strength. In some instances, leak-off tests are performed during the drilling process in order to intentionally step up to the fracture gradient of the formation at selected depths. The analyst may use this information to more accurately characterize stresses and rock strength.

Alternatively, stress data may be obtained from an interpolation of neighboring fields and/or neighboring wells. This means that far-field boundary conditions are considered, and then the data is "filled in" for the production area under study. However, it is preferred that the interpolation be accompanied and checked by actual in-field data such as by leak off tests.

Records of sand production within the development area may also be instructive. This is shown at Box 146. In this respect, the presence of sand production from a certain depth informs the analyst about the mechanical characteristics of the formation, particularly at the face of the formation. For example, the presence of sand in the production fluids is an indication of the cementation strength of the formation, or lack thereof. This, in turn, may assist in calibrating failure criteria.

Finally, information concerning the history of casing failures in the development area may also be employed. This is shown at Box 148. If casing failures have occurred, this probably is evidence of formation shear occurring in the region as a result of subsidence or heave. This would suggest potentially weak facies. For example, a formation comprised of bentonite or other depositional phase material might not show up in the log data. Bentonite is considered to have a low internal friction or low cementation, meaning that it is weak. Bentonite and shale formations are considered to be strong in compression but weak in shear.

In some instances, the production area under study may be too close to a model boundary. When this occurs, it may be desirable to expand the domain by adding a side-burden. This is done by extending the boundary of the model by adding side-burden to the original model. Preferably, the side-burden is at least three times larger than the original model.

The geomechanical initialization step 140 relies upon such information as that outlined in FIG. 4. The initial stress state is calculated and calibrated based on this information. This information is then mathematically incorporated into the utility program of the finite element mesh 120.

A next step in the geomechanical modeling method 100 is actually running the program. This is shown at Box 150 of FIG. 1. In the preferred embodiment of geomechanical analysis 100 herein, multi-scale geomechanical analysis 100 is conducted to predict thaw subsidence of permafrost layers via global models and more refined submodel(s) if necessary. However, before running the program 150, further steps should preferably be taken towards establishing an in situ stress state. This is particularly true in connection with the modeling of permafrost layers.

As noted above, permafrost layers reside in a frozen state substantially year-round. This creates a condition of geostatic equilibrium, meaning that the permafrost layer and the rock layers therebelow are generally stable relative to one another. Before simulating changes in the permafrost layer, the initial geomechanical forces acting against one another and that create the condition of equilibrium should be determined. This is referred to herein as an initial stress value ($\sigma_0$).

Figure 6:
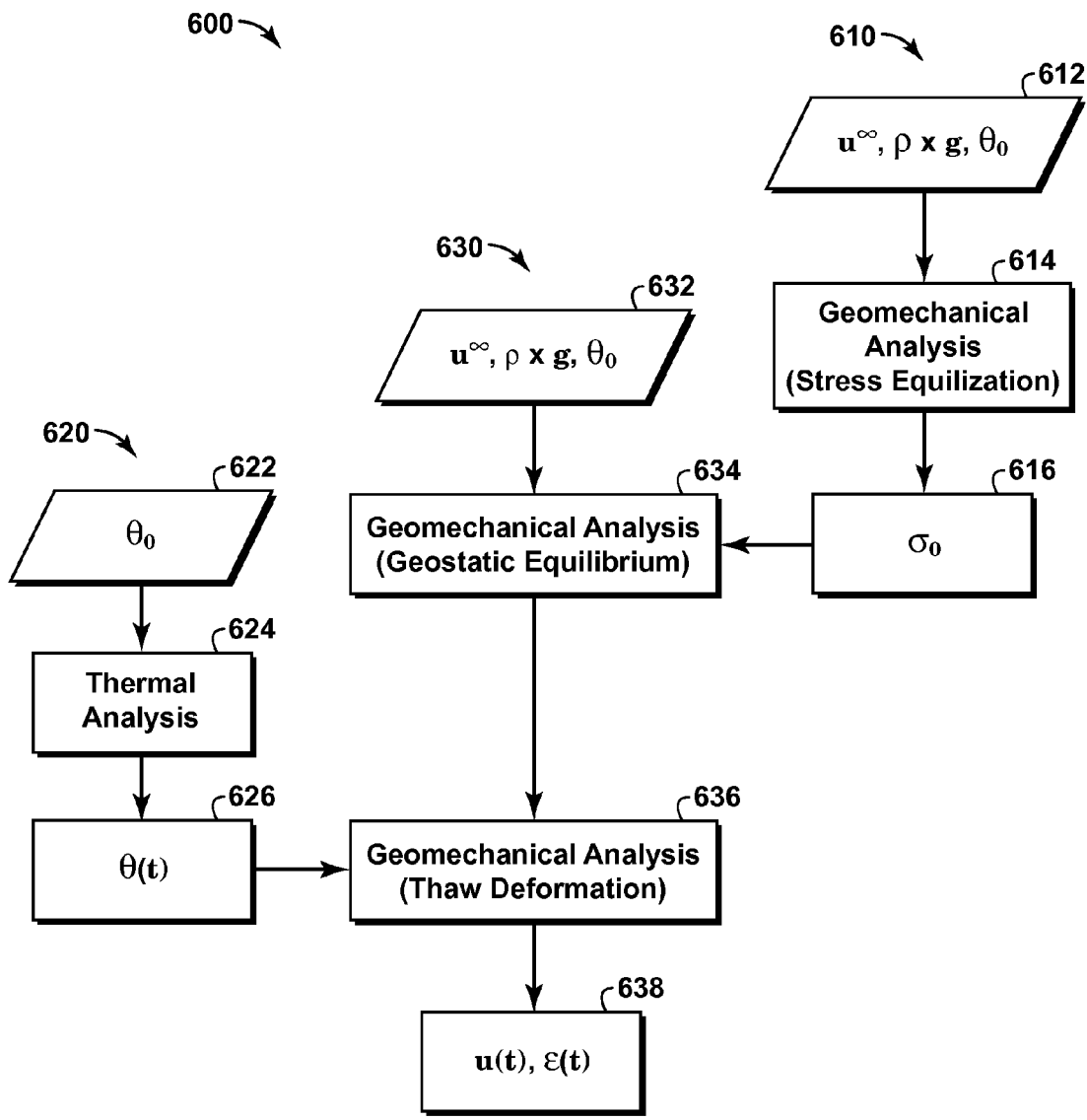
FIG. 6 is a flow diagram illustrating a method for modeling deformation in subsurface strata, in one embodiment.

FIG. 6 presents a flow chart showing a geomechanical analysis method 600 in connection with permafrost modeling, in one embodiment. Specifically, the flowchart shows general steps for a model 600 used in predicting deformation of subsurface strata as caused by thawing of permafrost. The permafrost model 600 includes an initial geomechanical analysis module 610, a thermal analysis module 620, and an initialized geomechanical module 630.

The permafrost model 600 begins with the initial geomechanical analysis module 610. The initial geomechanical analysis module 610 provides a computer-implemented process for initializing the stress state of the formation under study. The mathematical output of the initial geomechanical module 610 is the initial in situ stress value ($\sigma_0$) at different integration points of elements in a finite element mesh.

To run the initial geomechanical analysis module 610, the analyst first obtains values for certain initial parameters for the permafrost area under study. Such parameters include far-field boundary conditions, specific gravity, and temperature. The step of acquiring this data is indicated at Box 612.

In Box 612, far-field boundary conditions are represented as $u^\infty$. Far-field boundary conditions ($u^\infty$) refers to the undisturbed external stresses acting on the permafrost layers. This may be under-, over-, or side-burdens. In one aspect, these forces reside within an infinite domain. The stresses or forces comprising the far-field boundary conditions may be numerically generated through a process of extrapolation. This means that information from inside of the domain or permafrost area under study 120 is extrapolated to outside of the domain. Alternatively, far-field boundary conditions may be obtained from well logs and leak-off tests that have been taken from wells throughout the field.

Specific gravity is also obtained. This refers to the hydrostatic load or weight of the permafrost layer. Specific gravity is represented in Box 612 as the product of density ($\rho$) and gravity (g), or $\rho \times g$. Density ($\rho$) is the density of the permafrost while gravity (g) refers to the natural force of gravity. Density values are obtained through laboratory tests at various levels of the permafrost layer at the initial temperature, that is, before production begins. Laboratory tests are further conducted to obtain the density of the permafrost layer at various depths for increased temperatures. Of course, density values may also be obtained from density logs.

Initial temperature values are also obtained, represented by $\theta_0$. This refers to the initial temperature or thermal profile of the permafrost layer. The initial thermal profile $\theta_0$ is obtained when the wellbore is drilled, such as through a temperature log or via downhole sensors.

The initial boundary conditions ($u^\infty$), the specific gravity ($\rho \times g$), and the initial temperature profile ($\theta_0$) are imposed on the finite element mesh 120 to reach a state of geostatic equilibrium. In this way, the model 600 is designed to carry an initial stress in such a way that the model 600 yields non-appreciable displacements before any human interference. The mathematical result is an in situ stress value ($\sigma_0$) at various nodes in the mesh 120.

The stress value ($\sigma_0$) reflects the weight of the overburden, that is, the permafrost layer. It also reflects in situ tectonic forces acting on the area under study. In the case where permafrost layers are modeled, the initial tectonic forces are determined primarily for a region about 3,000 feet below the surface. This will capture tectonic forces acting upwardly from below the permafrost area under study so that initial stresses ($\sigma_0$) on the permafrost region are more accurately characterized.

Based upon the initial stress conditions of step 612, steps 110 through 150 are performed in the geomechanical analysis 100. This means that a finite element model is constructed based on the log data or lithology and temperature of the permafrost layer. The purpose is to acquire an initial stress value ($\sigma_0$) for the permafrost layer through computer simulation. The stress value ($\sigma_0$) is at time "0."

The step of running the geomechanical analysis is shown at Box 614. It is also indicated more generally in FIG. 1 at Box 150. The geomechanical analysis step 614 is conducted through a finite element-based utility program. In order to run the utility program, the geomechanical data and temperature profile are input into a simulator or "solver." A solver is a program that is able to solve the governing equations of interest. In geomechanics, the solver finds the solution that satisfies force equilibrium, compatibility and constitutive laws. In one aspect, the program is an available geomechanics software program such as ABAQUS™.

When running the utility program in connection with the geomechanical analysis 614, the pore pressures within the permafrost and the underlying strata are not changing. Similarly, the temperature is assumed to be at the initial temperature ($\theta_0$). Thus, the solution from the solver in step 614 is the in situ stress condition ($\sigma_0$) at time "0" at the various integration points of elements in the finite element mesh. The output value of in situ stress ($\sigma_0$) is shown at Box 616.

The steps 612, 614, 616 together constitute a pre-analysis to predict the in-situ stress inside the geomechanical model at geostatic equilibrium. Steps 612, 614 and 616 make up the geomechanical analysis module 610.

Along with the geomechanical analysis module 610, a thermal analysis module 620 is also provided. The purpose of the thermal analysis module 620 is to predict heat transfer from a wellbore and into the subsurface formation during production. The thermal analysis module 620 may also take into account changes in ambient temperature at the surface. In either instance, the thermal analysis module 620 predicts a radius of thaw, referred to as a "thaw bulb." The geomechanical analysis module 610 and the thermal analysis module 620 together are used to predict surface subsidence and subsurface deformation due to permafrost thaw during production life.

To run the thermal analysis module 620, the analyst first obtains temperature profile data for the permafrost area under study. The step of acquiring this data is indicated at Box 622.

The initial temperature is represented as ($\theta_0$). This is the same initial temperature ($\theta_0$) as was identified in connection with Box 612 for time "0".

A thermal analysis is then conducted. This is shown at Box 624. The thermal analysis 624 is based on the initial temperature ($\theta_0$) and heat conductivity of the permafrost layer. Heat conductivity is determined through laboratory testing. Other factors that may be included in the thermal analysis 624 are specific heat, latent heat of fusion, and formation density. The thermal analysis module 620 may then be based upon empirically determined values, design of experiments techniques, or mathematical quantification.

The thermal analysis 624 is used to predict the thaw bulb in the permafrost layer as a function of time. This is shown at Box 626. The result of the thermal analysis 624 is a temperature value $\theta(t)$ at various nodes in the mesh 120 at a selected time t. In this way a temperature history in the permafrost layer around a wellbore may be predicted. Steps 622, 624 and 626 together make up the thermal analysis module 620.

Once the initial stresses ($\sigma_0$) have been calculated at the elements and once the thermal analysis module 620 has been established, a geomechanical analysis program is again run. This is done through an initialized geomechanical analysis module 630. As with the first geomechanical analysis module 610, the initialized geomechanical analysis module 630 relies upon certain input parameters. These are listed at Box 632 and include far-field boundary conditions, specific gravity, and temperature within the permafrost region.

Far-field boundary conditions are once again represented as $u^\infty$. Far-field boundary conditions ($u^\infty$) refers to the undisturbed external stresses acting on the permafrost layers. The far field boundary conditions ($u^\infty$) may again be under-, over-, or side-burdens. The stresses or forces comprising the far-field boundary conditions may be numerically generated through a process of extrapolation. Alternatively, far-field boundary conditions may be again obtained from well logs and leak-off tests that have been taken from wells throughout the field.

Specific gravity is once again represented as the product of density ($\rho$) and gravity (g). Density ($\rho$) refers to the density of the permafrost while (g) refers to the natural force of gravity. The product of density ($\rho$) and gravity (g) represents the hydrostatic load or weight of the permafrost layer. In this instance, the specific gravity is the same as that input in Box 612 as the weight of the material has not changed.

Temperature is indicated as $\theta_0$. This refers to the initial temperature or thermal profile of the permafrost. The initial temperature $\theta_0$ in Box 632 is the same as that from Box 612. However, in the initialized geomechanical analysis module 630 the temperature will be changing over time.

Based upon the input parameters of step 632, steps 110 through 150 in the geomechanical analysis 100 are again performed. This means that a finite element model is again constructed based on the log data or lithology of the permafrost layer. This is indicated at Box 634. However, the step 634 imposes the initial stress ($\sigma_0$) values from the finite element mesh nodes into the model. Failure to bring the formation into geostatic equilibrium by imposing the initial stress value ($\sigma_0$) into the model will create immediate displacement without any temperature changes.

The module also incorporates the temperature history provided by the thermal analysis module 620. This is indicated at Box 636. The temperature history is not applied until the model has been placed in geostatic equilibrium. Thus, a heat transfer analysis is imposed onto the geomechanical analysis in order to determine thaw subsidence and accompanying stress history.

In operation, the two analysis steps 634, 636 are part of a single utility program representing model 600. The utility program is based upon the finite element mesh of step 120. The rock material properties of the strata are imposed in accordance with step 130. In the present application, the rock material properties are affected by temperature profiles. Thus, rock mechanics tests are conducted on preserved core samples from the permafrost. Such rock mechanics tests are designed to determine such factors as density, Young's Modulus, coefficient of expansion, thermal conductivity, specific heat, and latent heat. The tests are repeated at progressively increasing temperatures until a thaw temperature is reached. Alternatively, tests are conducted at progressively increasing temperatures until a temperature is reached that would likely be experienced in the permafrost as a result of the production of warm formation fluids. The rock material properties are integrated into the finite element mesh 120.

In addition, the stress state of the formation is initialized to geostatic equilibrium. This is in accordance with step 140 and in accordance with the initial geomechanics module 610. Thus, the analysis steps 634, 636 in geomechanics module 630 allow the analyst to model stress values $\sigma(t)$ in accordance with step 150 at various nodes of the finite element mesh. Different stress values $\sigma(t)$ are obtained in response to changes in subsurface temperature over time "t."

The analysis steps 634, 636 of module 630 may share the same nodes as the analysis step 614 of module 610. In order to run the utility program 600, the geomechanical data and temperature profile are once again input into a simulator or "solver." A solver is a program that is able to solve the governing equations of interest. In geomechanics, the solver finds the solution that satisfies force equilibrium, compatibility and constitutive laws. In one aspect, the program is an available geomechanics software program such as ABAQUS™.

Because the mesh 120 lies within a permafrost region, the temperature within the mesh 120 will change as a function of time. As the temperature changes, stresses acting inside of the mesh 120 may be predicted. Such stresses may include a compaction strain ($\epsilon_{3-3}$) and out-of-plane shear strains ($\gamma_{1-3}$, $\gamma_{2-3}$). Stress conditions within and below the permafrost layer may be predicted at future times t.

As a result of the geomechanical analysis steps 634, 636 of module 630, outputs u(t) and $\epsilon$(t) are acquired. This is shown at Box 638. Output u(t) refers to displacement history of the field; output $\epsilon$(t) refers to strain history of the field. Thus, the analyst is able to acquire measurements for both displacement and strain at various locations in a formation and at various projected times.

Figure 7:
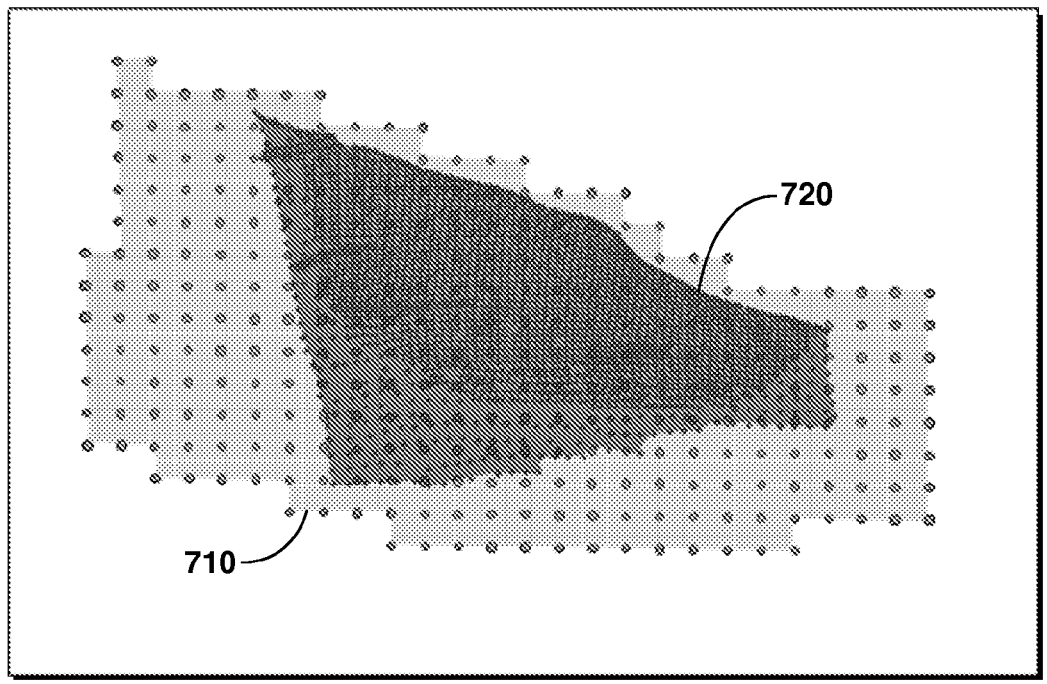
FIG. 7 indicates operation of two reservoir flow simulators. The first is a series of ABAQUS-modeled nodes set out in a uniform grid. This is from a finite-element analysis. The second is a map-based mesh.

FIG. 7 indicates the operation of the utility program 600 and the subsequent ABAQUS simulator. Two reservoir flow simulator grids 710, 720 are shown. Simulator 720 represents the reservoir model grid blocks or gridpoints from the finite element mesh 120. The other simulator 710 is a series of ABAQUS-modeled nodes. The ABAQUS™ simulator sets out the nodes from the reservoir simulator into a more uniform grid.

To solve for earth stress changes, a matrix is created within the physical boundaries. The matrix defines the properties of the various elements within the physical boundaries. The matrix includes a vector that defines the forces acting on each element in the structure. Once all the element matrices and vectors have been created, they are combined into a structure matrix equation. The structure matrix equation relates nodal responses for the entire structure to nodal forces.

After applying boundary conditions, the structure matrix equation is solved to obtain unknown nodal responses. Intra-element responses can be interpolated from nodal values using the functions which were defined over each element. Such interpolation is done through the utility program 600.

It is noted that commercially available reservoir flow simulators such as ECLIPSE™ only predict pressure and temperature changes within the reservoir. Such simulators lack the capability to solve for earth stress changes within and outside the reservoir. However, a separate solver such as ABAQUS™ allows the simulator to solve for the earth stress changes. Again, these may represent a compaction strain ($\epsilon_{3\text{-}3}$) and out-of-plane shear strains ($\gamma_{1\text{-}3}, \gamma_{2\text{-}3}$). As noted, in the present application simulated displacement u(t) and strain $\epsilon$(t) measurements are acquired at various locations in a formation and at various projected times.

Referring back to FIG. 1, a final optional step in the general modeling method 100 is a consistency analysis. This step is shown at Box 160. The purpose for the consistency analysis 160 is to provide a peer review of the results. This, in turn, enhances the accuracy of the modeling method 100 or, as appropriate, 600.

The peer review may be a human peer review. In this instance, a human peer will exercise his or her engineering mechanics judgment and geomechanics modeling experience to confirm that the results of the simulation 100 are reasonable or acceptable. This step 160 is a subjective review as opposed to simply manipulating data. However, in some cases, the peer review may be conducted through a separate program.

Figure 8:
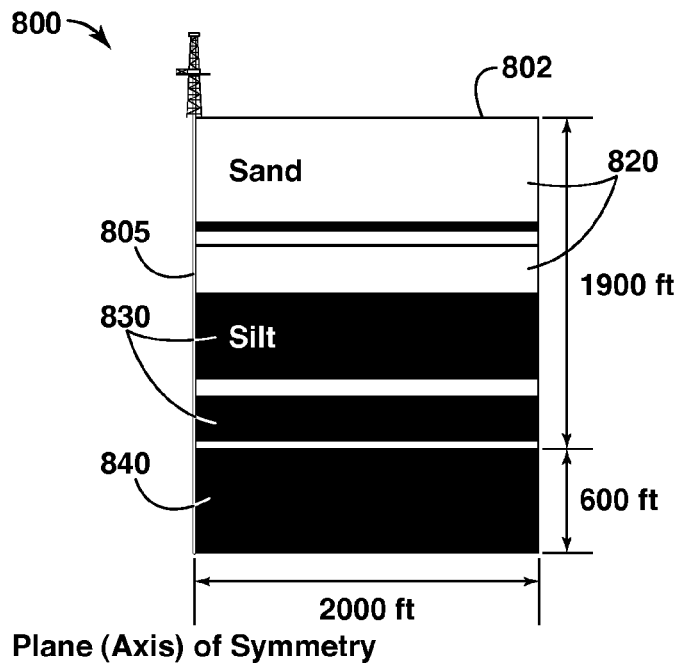
FIG. 8 is a cross-sectional view of illustrative subsurface strata. The strata are adjacent a wellbore extending through soil layers making up permafrost.

To demonstrate certain applications of the permafrost model 600, FIGS. 8 through 11 are provided. First, FIG. 8 is a diagram 800 providing a cross-sectional view of illustrative subsurface strata 810. The strata 810 are adjacent a wellbore 805 and extend downward from a surface 802. The strata define intermittent layers of sand 820 and silt 830. An upper portion of these layers represent permafrost, that is, soil layers that exist in a permanently frozen state. The layers 810 are the subject of computer simulation in accordance with the methods herein.

In the example of FIG. 8, the layers 820, 830 making up the permafrost extend down to 1,900 feet. This means that the permafrost region extends down almost 2,000 feet. An additional 600 feet of non-frozen stratum 840 is also indicated. The stratum 840 may be non-frozen soil, rock, or a mixture thereof. Below the cumulative depth of 2,500 feet are various rock layers, not shown.

Figure 9:
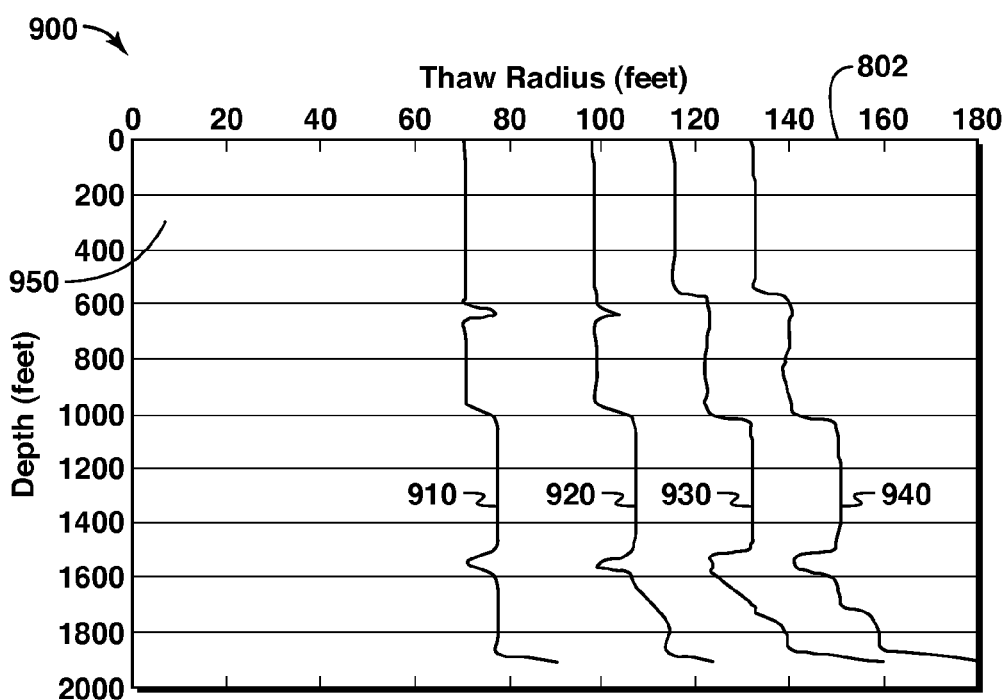
FIG. 9 is a chart graphically showing the strata of FIG. 8, and charting thaw radius as a function of depth. Lines are provided showing thaw radius at seven years, fourteen years, 20.93 years and 27.3 years.

FIG. 9 is a chart 900 graphically showing the strata 810 of FIG. 8, and charting thaw radius from the wellbore 805 as a function of depth. Thaw radius is shown along the "x" axis, while depth from the surface 802 is shown along the "y" axis. "Thaw radius" represents a temperature front in which temperatures within the formation have risen above the point of freezing over time.

Lines 910, 920, 930, 940 are provided showing thaw radius at successive points in time. The points in time represent years in which production fluids are produced through the wellbore 805 through a production line (not shown) extending through the strata 810:

line 910 represents thaw radius within the strata 810 after seven years;
line 920 represents thaw radius within the strata 810 after fourteen years;
line 930 represents thaw radius within the strata 810 after 20.93 years; and
line 940 represents thaw radius within the strata 810 after 27.3 years.

In FIG. 9, the subsurface strata 810 are divided into two regions. The region to the left 840 of the respective lines 910, 920, 930, 940 is thawed, while the region to the right 850 of the respective lines 910, 920, 930, 940 remains frozen. It can be seen from the chart 900 that as production operations continue over time, a thawed region 950 increases, that is, the lines move to the right. This indicates an increase in thaw radius.

Figure 10:
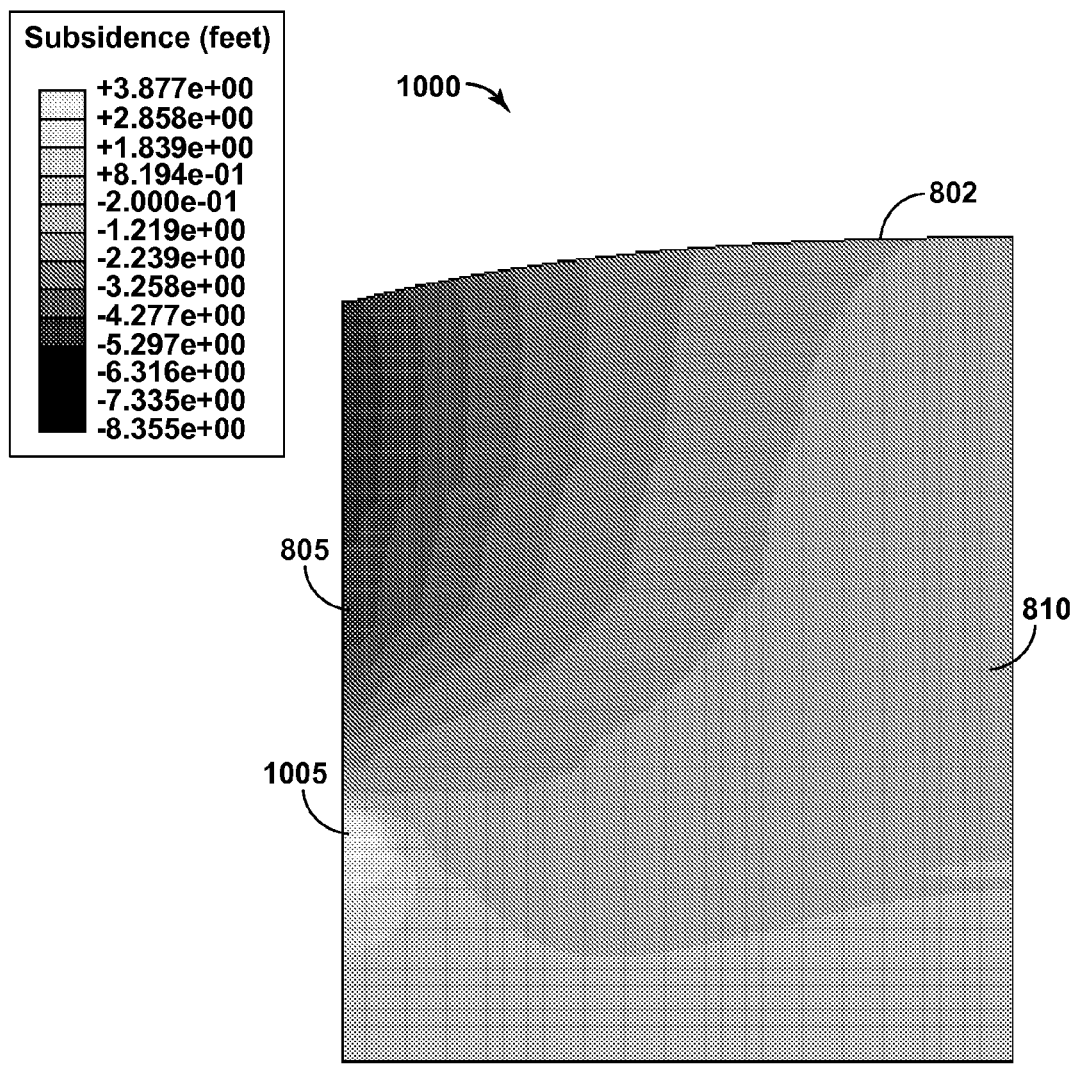
FIG. 10 is a graph also showing the strata of FIG. 8. The extent of thaw subsidence in feet is demonstrated at 27.3 years.

FIG. 10 is a graph 1000 also showing the strata 810 of FIG. 8. The extent of thaw-induced formation deformation relative to the original earth surface is demonstrated, in feet. In other words, a contour of thaw subsidence for the illustrative strata 810 is provided. The thaw subsidence is measured after 27.3 years of production. This is representative of line 940 from FIG. 9.

In order to more clearly demonstrate deformation of the permafrost layers in graph 1000, deformation has been magnified by 30 times. It can first be seen that the greatest amount of strata deformation is taking place near the wellbore 805. This is to be expected since the wellbore 805 represents the source of thermal energy. At the surface 802, approximately eight feet of subsidence has taken place near the wellbore 805. Thus, the top layer of permafrost subsides due to the softer foundation of the thawed bulb. The subsidence lessens as the graph 1000 moves away from the wellbore 805. At the surface, the line is slanted towards the wellbore 805, indicating greater subsidence proximate the wellbore 805.

Deformation of subsurface strata 810 is also taking place below the surface 802. Two types of deformation are taking place within the strata 810. One type of deformation is "negative" and represents a compaction of the subsurface layers. Compaction is seen taking place near the surface 802 and extending down approximately 1,200 feet. The other type of deformation is "positive," and represents a dilation of the subsurface layers. Dilation is seen taking place below about 1,200 feet. This condition of dilation may also be referred to as "rebound" or "unloading." It can be seen in FIG. 10 that the bottom layer is unloading and is dilating into the softer thawed region above.

A legend is provided in FIG. 10 to show extent of strata deformation. At the surface 802 and proximate the wellbore 805, subsidence has taken place in an amount of about eight feet. The degree of subsidence decreases away from the wellbore 805. The result is that the surface 802 is no longer level.

In contrast, at the bottom of the contour of FIG. 10, deformation is positive, indicating dilation. Dilation has taken place in an amount of about four feet proximate the wellbore 805.

It is understood that compaction of subsurface layers creates stress on the wellbore 805 and associated production equipment (not shown). It is also understood that dilation of subsurface layers creates stress on the wellbore 805 and associated production equipment. What may not be intuitive is that at the depth in the subsurface strata 810 where layers undergoing compaction and layers undergoing dilation meet, the degree of stress imposed on the wellbore 805 and associated production equipment is the greatest. At that point, shown in FIG. 10 as 1005, no stratum deformation is taking place.

In response to the results of FIG. 10, a completion engineer may choose to utilize a higher quality or "premium" casing along depths where strain levels are modeled to be highest. In this way, the opportunity for wellbore failure is minimized.

The contour of FIG. 10 demonstrates strata deformation; however, it only infers the existence of stress. FIG. 10 does not quantify stress. For this reason, FIGS. 11A and 11B are provided.

Figure 11A:
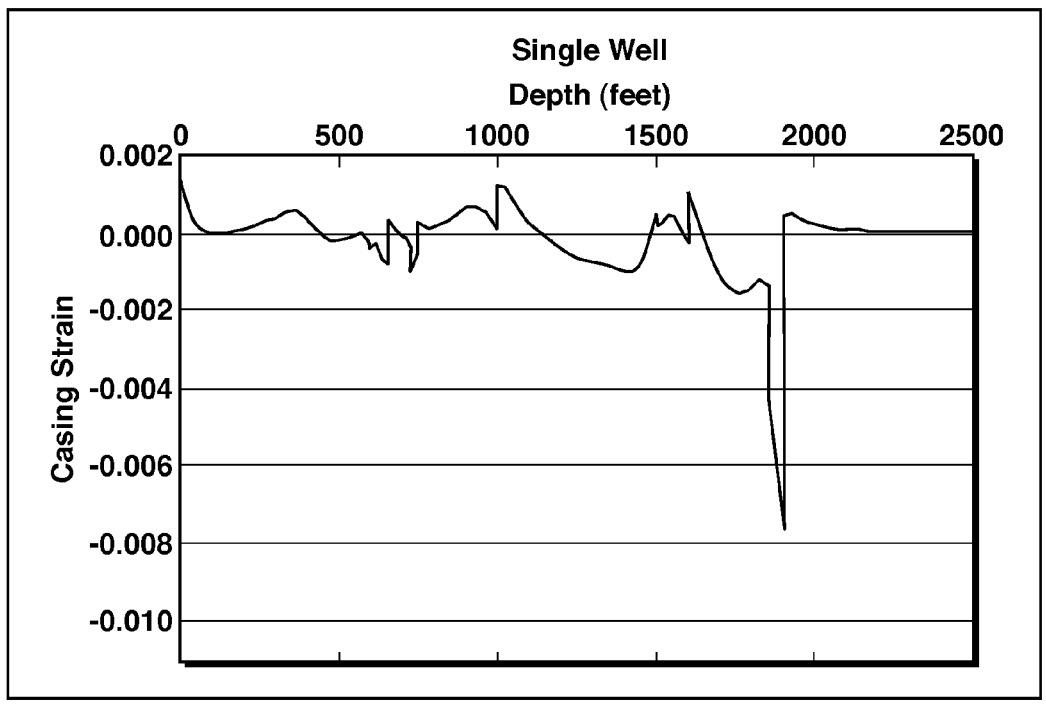
FIG. 11A is a Cartesian coordinate plotting casing strain within the strata of FIG. 11 as a function of depth. This is for a single well.
Figure 11B:
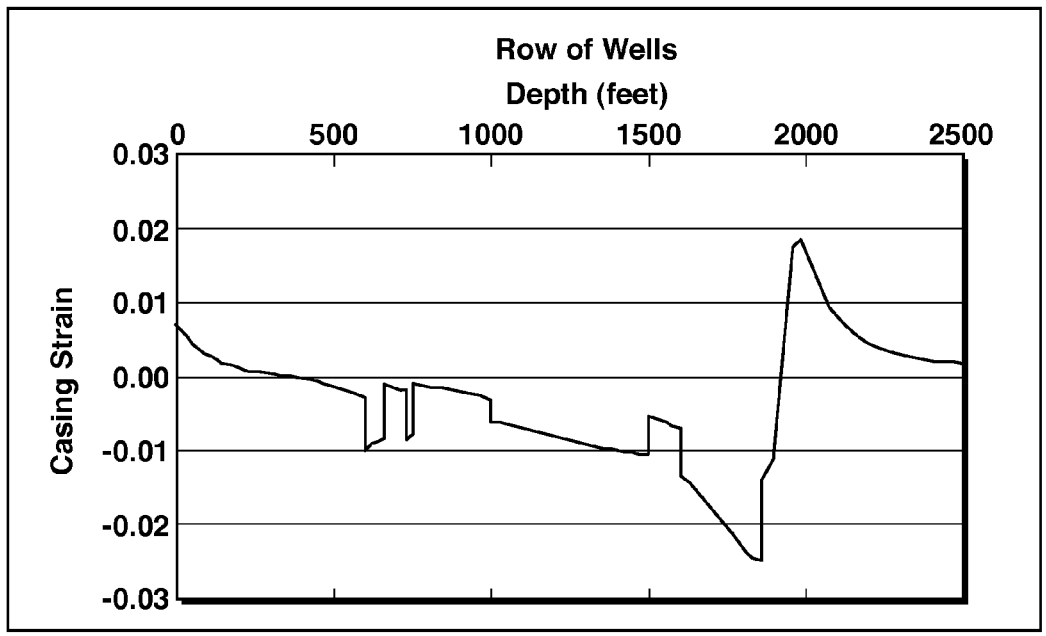
FIG. 11B is another Cartesian coordinate plotting casing strain within the strata of FIG. 11 as a function of depth. This is for a row of wells.

FIGS. 11A and 11B provide Cartesian coordinates 1100A, 1100B, respectively. The coordinates 1100A, 1100B plot casing strain within the strata 810 of FIG. 8 as a function of depth. In FIG. 11A, a single well is simulated; in contrast, in FIG.

11B, a row of wells is simulated. These coordinates 1100A, 1100B represent two extreme cases of thermal energy that may be modeled using a 2D model. In this respect, a single well generates the least amount of thermal energy into the formation 810, while a row of wells generates the greatest amount of thermal energy in a 2D model.

Referring specifically now to FIG. 11A, FIG. 11A is a Cartesian coordinate 1100A plotting casing strain within the strata 810 of FIG. 8 as a function of depth. This again is for a single well, meaning that the model 600 assumes only one well is in the development area in which the wellbore 805 is located. The computer simulation generating FIG. 11A assumes production after 27.3 years in accordance with line 940 of FIG. 9.

In the coordinate 1100A, strain is indicated along the "y" axis. Strain is a unitless value ranging from $-10.0 \times 10^{-3}$ to $10.0 \times 10^{-3}$. Depth of the formation is indicated along the "x" axis. Depth is measured in feet and extends from 0 feet down to 2,500 feet. This is reflective of the total depth of strata 810 shown in the diagram 800 of FIG. 8.

It is considered in the model 600 that any strain between $-2.0 \times 10^{-3}$ and $2.0 \times 10^{-3}$ creates only elastic strain on the wellbore 805. Normally, steel as used in a oil field pipe has a 0.2% strength. Any strain less than $-2.0 \times 10^{-3}$ or greater than $2.0 \times 10^{-3}$ will create plastic strain on the wellbore 805. Such is likely to cause damage to the production equipment, rendering the well inoperable and requiring remedial action.

In the coordinate 1100A, strain remains within the range of $-2.0 \times 10^{-3}$ and $2.0 \times 10^{-3}$ for most of the depth of the wellbore 805 under study. However, at a depth of about 1,800 feet, strain substantially increases to about $-8.0 \times 10^{-3}$. Thus, it is anticipated that a mechanical failure of the production equipment will take place by at least 27.3 years of production.

The simulation could be run for other points in time, including points in time less than 27.3 years. Such may be necessary to determine a first point in time when plastic deformation of the steel material is predicted to fail. Such a simulation also assists the completion engineer in selecting well spacing and casing grade. This, in turn, helps the completion engineer to protect casing integrity and well operability.

Referring again to FIG. 11B, FIG. 11B is another Cartesian coordinate 1100B plotting casing strain within the strata 810 of FIG. 8 as a function of depth. This represents a simulation for a row of wells. The simulation assumes that a line of wells is in the development area in which the wellbore 805 is located. The computer simulation generating FIG. 11B also assumes production after 27.3 years in accordance with line 940 of FIG. 9.

In the coordinate 1100B, strain is again indicated along the "y" axis. In this case, the values extend from −0.03 to 0.03. Depth of the formation is indicated along the "x" axis. Depth is measured in feet, again in feet. Depth extends from 0 feet down to 2,500 feet, reflective again of the total depth of strata 810 shown in the diagram 800 of FIG. 8.

It is once again considered in the model 600 that any strain between −0.2% and +0.2% creates only elastic strain on the wellbore 805. However, any strain less than −0.2% or greater than +0.2% will create plastic strain on the wellbore 805. This is likely to cause damage to the production equipment that renders the well inoperable, requiring remedial action.

In the coordinate 1100B, strain is about $7 \times 10^{-3}$ at the surface, or "0" depth. As the depth increases in the strata 810, strain slowly decreases. At a depth of about 1,600 feet, the strain quickly decreases, moving from −0.015 at 1,600 feet to −0.025 at 1,800 feet. However, at 1,800 feet the strain dramatically increases to 0.019. This indicates the depth at which layers transition from a state of compaction to a state of dilation.

From coordinate 1100B, it is inferred that the wells will undergo a mechanical failure of the production equipment by at least 27.3 years of production. This will be at a depth of about 1,900 feet. This simulation could be run for other points in time, including points in time less than 27.3 years to determine the true life of the production equipment in the face of geomechanical stresses.

The geomechanical modeling methods 100, 600 provided in FIGS. 1 and 6, respectively, are discussed in the context of analyzing strata deformation incident to permafrost thaw. However, it should be noted that the geomechanical modeling method 100, 600 are not limited to the analysis of permafrost or thaw-induced subsidence; indeed, the modeling method 100 has applicability to formations containing hydrocarbon reservoirs that are experiencing changes in pore pressure incident to production activities. This would be part of more traditional reservoir simulation.

Figure 12A:
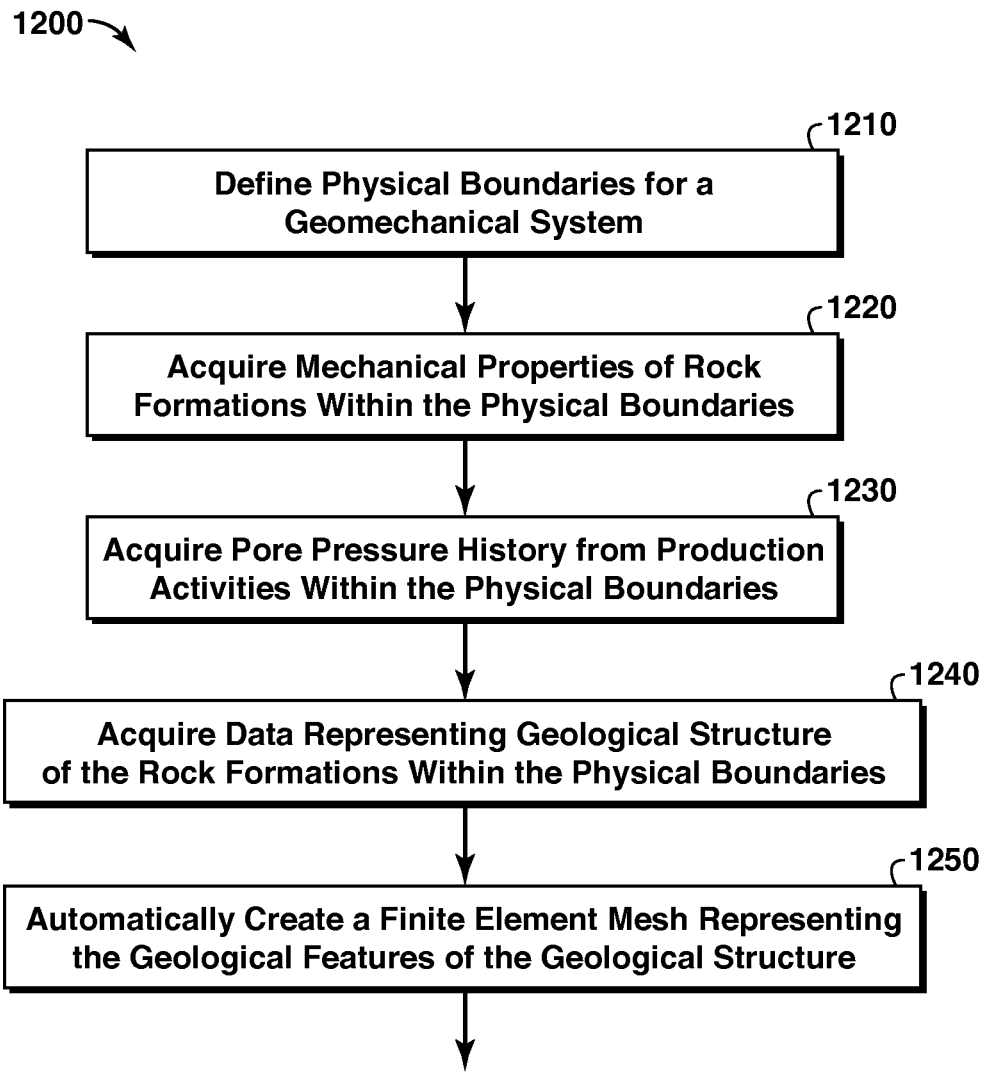
FIGS. 12A and 12B present a flow chart showing steps that may be taken to run a reservoir simulation model in accordance with one embodiment of the present invention.
Figure 12B:
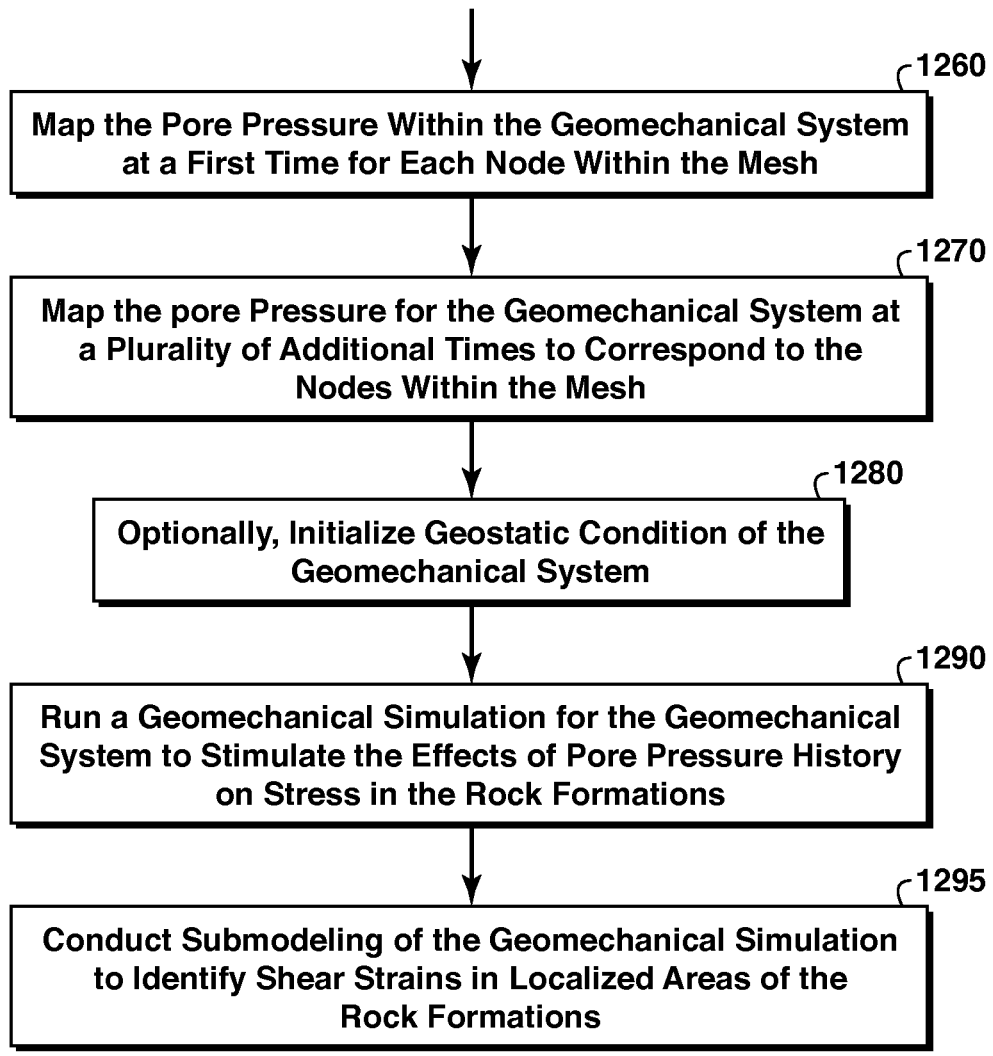

FIGS. 12A and 12B demonstrate a method for reservoir simulation that, in one embodiment, applies steps from the geomechanical modeling method 100. FIGS. 12A and 12B together present steps which provide a reservoir simulation method 1200. The purpose of the method 1200 is to evaluate whether changes in reservoir pressure as a result of production activities will affect formation stability. Such production activities may include withdrawal of reservoir fluids from a reservoir, injection of fluids into a reservoir under study, or a combination thereof.

The method 1200 may be generally characterized as a computer-implemented method for modeling a geomechanical system. In one aspect, the method 1200 first includes defining physical or "geometric" boundaries for the geomechanical system. This step is indicated at Box 1210 of FIG. 12A. The step of Box 1210 is consistent with Box 128 of FIG. 4, described above.

The method 1200 also includes acquiring mechanical properties of rock formations within the physical boundaries. This step is indicated at Box 1220 of FIG. 12A. The step of Box 1220 is with a part of Box 130 of FIG. 1, described above.

The method 1200 also includes acquiring pore pressure history from production activities within the physical boundaries. This step is indicated at Box 1230 of FIG. 12A. The step of Box 1230 is consistent with Box 126 of FIG. 4, described above. Acquiring pore pressure history 1230 may optionally include acquiring other reservoir characteristics such as temperature history, porosity or permeability.

The method 1200 also includes acquiring data representing geological structure of the rock formations within the physical boundaries. This step is indicated at Box 1240 of FIG. 12A. The step of Box 1240 is consistent with Boxes 112 and 114 of FIG. 2, described above. The step 1240 may be part of the preparation of a map-based geological model.

The method 1200 also includes automatically creating a finite element mesh representing the geological features of the geomechanical system. This step is indicated at Box 1250 of FIG. 12A. The step of Box 1250 is consistent with Boxes 122 and 124 of FIG. 4, described above. In this respect, step 1250 may be the derivation of a finite-element based geological model from a map-based geological grid.

The mesh defines a plurality of nodes representing points in space. Each of the points has potential displacement in more than one direction, meaning more than one degree of freedom. Such displacement may be translational in an "x," a "y," or a "z" direction. Such displacement may also optionally be rotational about a plane in the "x" direction, a plane in the "y" direction, and/or a plane in the "z" direction.

It is preferred that the mesh provide a positive value for any rock formations indicated from the nodes representing the geological structure to have a zero thickness. The purpose is to create volume for that rock formation. In this way, the repair of singular geologic entities such as "pinchouts" and erosional features is automated. The geological structure may be converted into a finite element mesh using a utility program that is compatible with a finite element analysis solver. An example of such a utility program is ABAQUS™.

The method 1200 also includes mapping the pore pressure within the geomechanical system at a first time for nodes within the mesh. This step is indicated at Box 1260 of FIG. 12B. The step of Box 1260 is different from the step of Box 1230, in that the pore pressure history acquired in step 1230 is now being loaded into the utility program at the first time.

The method 1200 also includes mapping the pore pressure for the geomechanical system at a plurality of additional times to correspond to the nodes within the mesh. This step is indicated at Box 1270 of FIG. 12B. This means that the pore pressure history acquired in step 1230 is now being loaded into the utility program at a plurality of additional times.

The method 1200 further includes initializing the geostatic condition of the geomechanical system. This step is provided at Box 1280. The initialization step is run in accordance with the processes described in connection with FIG. 6 and step 140 of FIG. 1. The initialization step 1280 may be taken when a plasticity model is employed for the simulation or when a phase transition occurs in the formation such as the thawing of permafrost. In the absence of these conditions, the initialization step 1280 may be omitted.

The method 1200 includes running the reservoir simulation for the geomechanical system to simulate the effects of pore pressure history on stress in the rock formations. This step is indicated at Box 1290 of FIG. 12B. The step of Box 1290 is consistent with Box 150 of FIG. 1, described above. The effects may be mathematically quantified in the form of compaction strain values ($\epsilon_{3\text{-}3}$) and out-of-plane shear strain values ($\gamma_{1\text{-}3}$, $\gamma_{2\text{-}3}$) at selected locations within the geomechanical system. Preferably, the out-of-plane coordinates are transverse to the compaction strain coordinate.

The step 1290 may also take into account the effects of temperature changes within the formation. In this instance, a thermal module such as module 620 is employed in the reservoir simulation. To effectuate this, step 1260 involving the mapping of pore pressure within the geomechanical system should also involve mapping the temperature within the geomechanical system. Thus, pressure and temperature are each mapped at a first time for nodes within the mesh. In addition, step 1270 involving the mapping of pore pressure within the geomechanical system at a plurality of additional times should also involve mapping the temperature within the geomechanical system at a plurality of additional times for nodes within the mesh.

Finally, the method 1200 optionally includes submodeling in order to determine shear strains acting at a more defined point within the formation. This step is indicated at Box 1295 of FIG. 12B. In order to create the submodel, the operator identifies a region of interest. Then, appropriate submodel boundaries are defined. This step 1295 may be repeated for several levels, meaning that two, three, four or "n" number of size domains may be consecutively analyzed to allow the operator to zoom in to a point within the reservoir model. For example, the operator may move from a global level that is 100 miles×100 miles, to several intermediate submodels that are 1 mile×1 mile, and finally to a near well bore level that is 1 foot×1 foot. In this way, compaction strain ($\epsilon_{3\text{-}3}$) and out-of-plane shear strains ($\gamma_{1\text{-}3}$, $\gamma_{2\text{-}3}$) acting upon a wellbore for a specific well may be determined.

Figure 13:
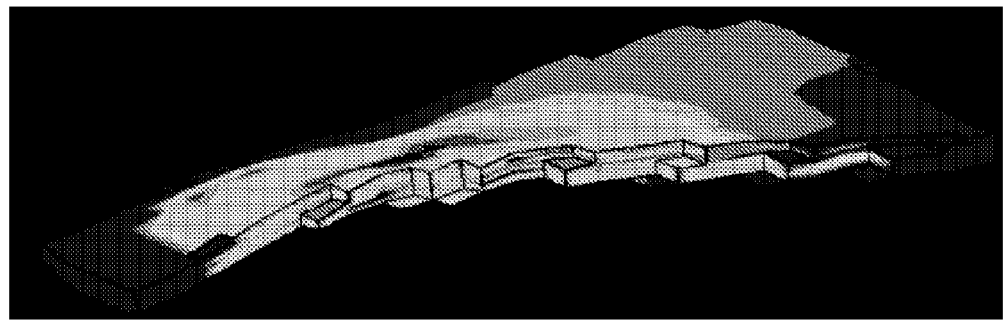
FIG. 13 is a pressure contour plot mapped from a geomechanical modeling simulation.

To demonstrate operation of the method 1200, FIG. 13 is provided. FIG. 13 is a pressure contour plot mapped from a reservoir simulation. In this simulation, the exponent of weighting ("n") equals 2. A multi-scale geomechanical simulation is implemented based on an assumed production history. It is noted that a region of high depletion will result in a reduction of pore pressure. This, in turn, will yield higher compaction within the reservoir, potentially leading to changes in rock layer thicknesses and surface subsidence.

It is noted that in the creation of the geomechanical model 1200, the model may represent a large area, for example, up to 100 miles by 100 miles. Within this model 1200, a series of elements that are, for example, a half mile by a half mile in area may be created. However, it may be desirable for the analyst to inspect or understand the geomechanical condition of a smaller area within an individual element. Accordingly, a submodeling technique has been developed that allows the analyst to more accurately characterize a smaller portion or domain of a production area under study. Stated another way, submodeling means the ability to analyze or "zoom in" on a smaller domain within the overall production area.

The submodel defines a complimentary finite-element-based submodel having increasing levels of refinement from the finite element mesh. By increasing the level of refinement, the resolution is improved due to the smaller domain and the presence of additional elements employed in the submodel. It is understood that it is not practical to have small element sizes of, perhaps, several feet when the region of interest is in excess of, perhaps, 100 or more miles. By progressive transition from a larger global model to a smaller submodel, the program can more accurately solve the physical variables of interest.

In order to create the submodel, the operator identifies a region of interest. Then appropriate submodel boundaries are defined. The submodel is assigned a more discretized mesh to obtain better resolution of physical properties. This process could be repeated for several levels, meaning that two, three, four or "n" number of size domains may be consecutively analyzed to allow the operator to zoom in to a point within the reservoir model. For example, the operator may move from a global level that is 100 miles×100 miles, to several intermediate submodels that are 1 mile×1 mile, and finally to a near well bore level that is 1 foot×1 foot. The benefit is that strain values ($\gamma_{1\text{-}3}$, $\gamma_{2\text{-}3}$) may now be determined at nodal points in the finite element mesh.

Figure 14:
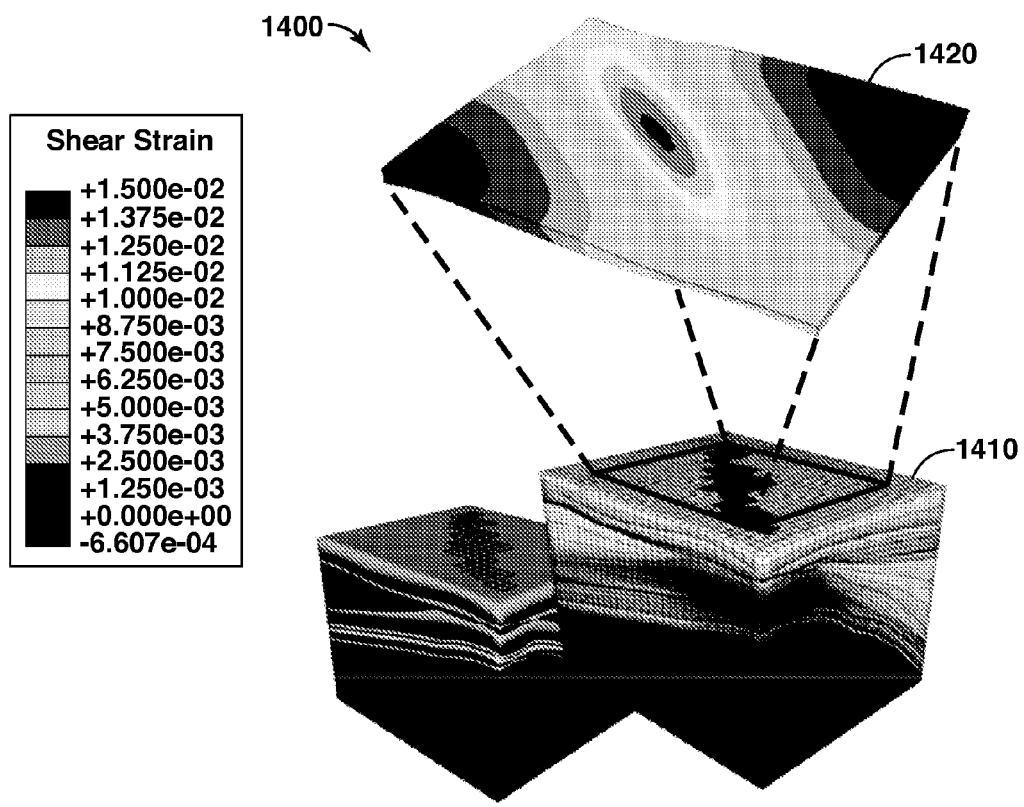
FIG. 14 presents a sectional view of a global model and submodel of a geomechanical model without nonconformities. The inset of FIG. 14 shows the contour of effective shear strain of a submodel caused by in-situ stress changes from production.

FIG. 14 presents a sectional view of a global model 1400. The model 1400 demonstrates a formation 1410 under study. In this illustrative embodiment, the formation 1410 is without nonconformities.

In FIG. 14, an inset 1420 is shown. The inset 1420 of FIG. 14 shows the contour of effective shear strain of a submodel caused by the in situ stress changes from production. The contour plots shows region of high shear strain acting within a formation. Thus, one result of running the geomechanical simulation model 100 is the ability to determine shear strain forces acting within the formation in response to changes in pore pressure.

As can be seen, improved methods for geomechanical modeling are offered herein. The methods employs multi-scale geomechanical computer simulations of earth stress changes associated with the hydrocarbon recovery process. In various embodiments, the methods allow an analyst to map pressure, temperature, fluid flow, displacement or stress boundary conditions from a map-based discretized simulation domain to a three-dimensional, finite-element-based discretized simulation domain. The methods herein may have particular application for forecasting capabilities for use with model predictive software tools to mitigate well casing failure associated with hydrocarbon recovery in Arctic regions such as Point Thomson, Taglu and Odoptu. Benefit of certain embodiments of the methods herein include accurate and systematic analysis for predicting thaw subsidence around production wells, and forecast casing strain failure in Arctic regions.

While it will be apparent that the inventions herein described are well calculated to achieve the benefits and advantages set forth above, it will be appreciated that the inventions are susceptible to modification, variation and change without departing from the spirit thereof.

What is claimed is:

1. A computer-implemented method for modeling deformation in subsurface strata within a geomechanical system, comprising:
    defining physical boundaries for the geomechanical system;
    acquiring one or more mechanical properties of the subsurface strata within the physical boundaries;
    acquiring one or more thermal properties of the subsurface strata within the physical boundaries;
    creating a finite element mesh representing the geomechanical system, the mesh defining a plurality of elements having system nodes representing points in space, each node having potential displacement in more than one direction, and each element being populated with at least one of the mechanical properties and the thermal properties;
    providing a computer-implemented finite element analysis program for the finite element mesh, the program solving for in situ stress at selected nodes;
    running the finite element analysis program a first time to acquire in situ stress values within the geomechanical system at selected nodes at an initial time, thereby initializing a geostatic condition of the geomechanical system;
    running the finite element analysis program a second time to acquire in situ stress values within the geomechanical system at selected nodes at a subsequent time in response to changes in at least one of the mechanical or thermal properties in the geomechanical system;
    determining from the finite element analysis program, system node displacement, traction changes, and stress changes for each element within the system from the first time to the subsequent time within the system mesh;
    identifying a subset system of the geomechanical system for modeling analysis at high mesh resolution and defining host elements of the geomechanical system that comprise the subset system;
    running a pre-processor over the subset system host elements to create a high resolution finite element system mesh representing the subset system, the high resolution mesh defining a plurality of high resolution elements having high resolution system nodes representing points in space with each high resolution element being populated with the at least one of the mechanical properties and thermal properties;
    transferring by interpolation, the determined system node displacement, the traction changes, and the stress changes from the determined results of the geomechanical system simulation model to the high resolution subset system nodes; and
    running a geomechanical simulation model for the subset system at high resolution, at each of a first time and the subsequent time to simulate the effects of changes in stress on one or more modeled properties within the subset system.

2. The method of claim 1, further comprising:
    creating a thermal analysis module which correlates changes in the one or more thermal properties within the subsurface strata to changes in mechanical properties of the subsurface strata within the physical boundaries; and
    imposing the thermal analysis module into the finite element analysis program so that projected changes in the one or more thermal properties affect in situ stress values within the subsurface strata.

3. The method of claim 2, wherein:
    the in situ stress values obtained from running the finite element analysis program a second time place the geomechanical system at geostatic equilibrium.

4. The method of claim 3, wherein the thermal properties comprise temperature, thermal conductivity, specific heat, latent heat of fusion, or combinations thereof.

5. The method of claim 3, wherein:
    the subsurface strata comprises a permafrost layer; and
    the in situ stress values obtained from running the finite element analysis program a second time are a result, at least in part, of changes in temperature within the permafrost layer.

6. The method of claim 5, wherein the changes in temperature within the permafrost layer are caused by the transport of production fluids through the permafrost layer over a period of time.

7. The method of claim 6, wherein the changes in temperature within the permafrost layer are further caused by changes in ambient temperature at a surface.

8. The method of claim 4, wherein changes in thermal properties within the subsurface strata cause changes in mechanical properties.

9. The method of claim 8, wherein the mechanical properties comprise Young's modulus, Poisson's ratio, thermal expansion coefficient, or combinations thereof.

10. The method of claim 3, wherein the finite element mesh provides a null value for any rock formations having a zero thickness as derived from subsurface data.

11. The method of claim 10, wherein the subsurface data comprises well logging data, seismic data, or combinations thereof.

12. The method of claim 3, further comprising:
    acquiring subsurface data for the subsurface strata within the physical boundaries; and
    entering the subsurface data for the subsurface strata within the physical boundaries, into a pre-processor program to create a three-dimensional grid in a map-based computer model.

13. The method of claim 12, wherein the three-dimensional grid is automatically compiled from the subsurface data.

14. The method of claim 13, wherein:
    the subsurface data comprises well logging data, seismic data, or combinations thereof; and
    the three-dimensional grid defines nodes in a geological structure that are converted into the nodes of the finite element mesh by means of a utility program.

15. The method of claim 14, wherein the utility program automatically accounts for and repairs any singular geologic entities in the rock formations such as pinchouts and erosional features.

16. The method of claim 3, wherein (i) far-field boundary conditions, (ii) specific gravity, and (iii) initial temperature in the subsurface strata are entered into an initial geomechanical analysis module as part of the finite element mesh program when running the finite element mesh program a first time.

17. The method of claim 15, wherein (i) far-field boundary conditions, (ii) specific gravity, and (iii) initial temperature in the subsurface strata are entered into an initialized geomechanical module as part of the finite element mesh program when running the finite element mesh program a second time.

18. The method of claim 5, further comprising:
analyzing the in situ stress values at the subsequent time to select one or more items of wellbore equipment to be placed in the permafrost layer to minimize the prospects of damage as a result of an increase in temperature.

19. The method of claim 18, wherein changes in temperature produce (i) displacement in the subsurface strata, (ii) increased strain in the subsurface strata, or (iii) combinations thereof.

20. The method of claim 19, wherein the finite element analysis program generates a projected displacement history and a projected strain history of the subsurface strata in response to a simulated increase in temperature within the permafrost layer.

21. The method of claim 3, wherein prior to running the finite element analysis program the first time, the geostatic condition of the geomechanical system is further initialized based upon (i) data from leak-off tests from wells drilled within the physical boundaries, (ii) well logging data taken from wells drilled within the physical boundaries, (iii) records of sand production from wells completed within the physical boundaries, (iv) completion test records from wells completed within the physical boundaries, or (v) combinations thereof.

22. The method of claim 3, wherein prior to running the finite element analysis program the first time, the geostatic condition of the geomechanical system is further initialized by reviewing a history of casing failures from wells within the physical boundaries of the geomechanical system.

23. The method according to claim 1, further comprising:
mapping the one or more reservoir characteristics within the geomechanical system at the first time for the system nodes within the mesh; and
mapping the one or more reservoir characteristics at the another time to correspond to the system nodes within the mesh.

24. The method according to claim 1, further comprising:
enhancing the characteristics of the high resolution nodes of the subset system with additional mechanical components and local geological features of interest.

25. The method according to claim 1, further comprising:
mapping the one or more reservoir characteristics within the high resolution subset system at the first time for the high resolution system nodes within the mesh; and
mapping the one or more reservoir characteristics at the another time to correspond to the system nodes within the mesh.

26. The method according to claim 1, wherein transferring by interpolation comprises:
calculating position vectors inside a host element and summing the product of shape functions and displacement, for each of the high resolution nodes of a host element.

* * * * *